（12） United States Patent
Hatamura et al.

(10) Patent No.: US 8,534,261 B2
(45) Date of Patent: Sep. 17, 2013

(54) FOUR-CYCLE ENGINE

(75) Inventors: Koichi Hatamura, Chiba (JP); Toshio Yamada, Shizuoka (JP); Atsushi Morita, Hyogo (JP)

(73) Assignees: Hatamura Engine Research Office Ltd., Hiroshima (JP); CD-ADAPCO Japan Co., Ltd., Kanagawa (JP)

( * ) Notice: Subject to any disclaimer, the term of this patent is extended or adjusted under 35 U.S.C. 154(b) by 551 days.

(21) Appl. No.: 12/599,470

(22) PCT Filed: May 9, 2008

(86) PCT No.: PCT/JP2008/058612
§ 371 (c)(1),
(2), (4) Date: Mar. 23, 2010

(87) PCT Pub. No.: WO2008/140036
PCT Pub. Date: Nov. 20, 2008

(65) Prior Publication Data
US 2010/0236517 A1    Sep. 23, 2010

(30) Foreign Application Priority Data
May 9, 2007    (JP) .................................. 2007-125049

(51) Int. Cl.
*F02B 3/00*     (2006.01)
*F02B 47/08*    (2006.01)
*F02B 33/00*    (2006.01)
*F02M 69/04*    (2006.01)

(52) U.S. Cl.
USPC ...... 123/299; 123/568.14; 123/565; 123/445; 123/90.15

(58) Field of Classification Search
USPC .............. 123/90.15, 90.17, 445, 565, 568.11, 123/568.14, 568.19, 568.21–568.24, 299; 60/297, 298
See application file for complete search history.

(56) References Cited

U.S. PATENT DOCUMENTS 5,063,887 A * 11/1991 Ozawa et al. ............. 123/65 PE
5,063,888 A * 11/1991 Ozawa et al. ............. 123/65 PE
(Continued)

FOREIGN PATENT DOCUMENTS

GB     2328980 A      3/1999
JP     11-200902 A    7/1999
(Continued)

OTHER PUBLICATIONS

Supplementary European Search Report for European Patent Application No. 08752498.9 based on PCT/JP2008/058612 issued on Jul. 28, 2008.
Development of temperature distribution measurement by 2 tracer LIF, JSAE 20055667, Sep. 29, 2005, pp. 7-12, Japan.
International Search Report, directed to PCT/JP2008/058612, mailed on Jun. 24, 2008, 2 pages.

*Primary Examiner* — John T. Kwon
*Assistant Examiner* — Johnny Hoang
(74) *Attorney, Agent, or Firm* — Smith Patent Office

(57) ABSTRACT

A four-cycle engine (1) structured to introduce fresh air into a cylinder (1a) via an intake port (1d) opened/closed by intake valves (IN1, IN2) and suck exhaust gas back into the cylinder (1a) via an exhaust port opened/closed by exhaust valves (EX1, EX2), wherein the exhaust port has a first exhaust port (1p) and a second exhaust port (1e), and the exhaust gas is sucked in back from the first exhaust port (1p) and secondary air is sucked in from the second exhaust port (1e) to form, in the cylinder (1a), a first temperature layer (T1) at a high temperature mainly composed of the exhaust gas and a second temperature layer (T2) at a temperature lower than that of the first temperature layer (T1) mainly composed of the secondary air.

19 Claims, 19 Drawing Sheets

(56) References Cited

U.S. PATENT DOCUMENTS

| | | | |
|---|---|---|---|
| 5,163,396 A * | 11/1992 | Fukuda et al. | 123/298 |
| 6,553,959 B2 * | 4/2003 | Xu et al. | 123/295 |
| 6,932,062 B2 * | 8/2005 | Kuzuyama et al. | 123/568.13 |
| 6,988,365 B2 * | 1/2006 | Sasaki | 60/605.2 |
| 7,246,485 B2 * | 7/2007 | Ohki et al. | 60/285 |
| 7,454,897 B2 * | 11/2008 | Mizuguchi | 60/285 |
| 7,665,297 B2 * | 2/2010 | Suzuki et al. | 60/287 |
| 7,725,243 B2 * | 5/2010 | Natsui et al. | 701/105 |
| 7,753,039 B2 * | 7/2010 | Harima et al. | 123/676 |
| 7,908,844 B2 * | 3/2011 | Kamoshita et al. | 60/286 |
| 7,934,372 B2 * | 5/2011 | Haseyama et al. | 60/286 |
| 8,014,931 B2 * | 9/2011 | Araki et al. | 701/103 |
| 8,142,247 B2 * | 3/2012 | Konakawa et al. | 440/89 H |
| 2004/0069054 A1 | 4/2004 | Shimizu et al. | |
| 2005/0016496 A1 | 1/2005 | Hitomi et al. | |
| 2005/0081836 A1 * | 4/2005 | Winsor | 123/568.14 |

FOREIGN PATENT DOCUMENTS

| | | |
|---|---|---|
| JP | 2001-263108 A | 9/2001 |
| JP | 2002-213259 A | 7/2002 |
| JP | 2004-124761 A | 4/2004 |
| JP | 2005-016408 A | 1/2005 |
| JP | 2010-019143 A | 1/2010 |

* cited by examiner

FOUR-CYCLE ENGINE

TECHNICAL FIELD

The present invention relates to a four-cycle engine structured to introduce fresh air into a cylinder via an intake port and to suck exhaust gas back into the cylinder via an exhaust port.

Note that in Description of this application, air introduced into the cylinder via the intake port is referred to as fresh air, and air introduced into the cylinder via the exhaust port is referred to as secondary air.

BACKGROUND ART

Homogeneous Charge Compression Ignition (HCCI) engine is expected as means for realizing a fuel efficiency as high as the diesel engine while maintaining the low emission characteristics inherent in the gasoline engine. Note that fuel is supplied by injection near the compression top dead center in a normal diesel engine, whereas fuel is injected earlier into a combustion chamber or mixed with air in an intake port and introduced into a combustion chamber, and then the premixed gas is auto-ignited near the compression top dead center by combustion reaction at a compression temperature in the HCCI engine.

The present inventor has considered that it is important to control an internal EGR amount and realize supercharging without a supercharger in order to widen the operation range of the HCCI engine, and proposed the method therefor.

Though the operation range of the HCCI engine can be widened by the above-described method, practical HCCI operation cannot be realized because the rate of pressure rise is too high in the high load operation range. As means for decreasing the rate of pressure rise to realize combustion as slow as the normal spark ignition engine, stratification of the mixed gas and temperature distribution is regarded as effective (see Non-patent Document 1).
[Non-patent Document 1] JSAE20055667

DISCLOSURE OF THE INVENTION

Problems to be Solved by the Invention

Aforementioned Non-patent Document 1 discloses that intake air in two intake ports are heated by heaters to make a temperature difference and that when the temperature difference is increased, the rate and period of heat generation greatly vary. However, in aforementioned Document 1, realization of the slow combustion has been proved by experiments and simulation but its method is far from practical.

The present invention has been made in consideration of the past circumstances, and its object is to provide a four-cycle engine realizing stratification of the temperature distribution with a simple structure to be able to prevent knocking under a high load.

Means for Solving the Problems and Effects Thereof

The present invention is related to a four-cycle engine structured to introduce fresh air into a cylinder via an intake port opened/closed by an intake valve and suck exhaust gas back into the cylinder via an exhaust port opened/closed by an exhaust valve. The exhaust port has a first exhaust port and a second exhaust port, and the exhaust gas is sucked in back from the first exhaust port and secondary air is sucked in from the second exhaust port to form, in the cylinder, a first temperature layer at a high temperature containing the exhaust gas in the fresh air and a second temperature layer at a temperature lower than that of the first temperature layer containing the secondary air in the fresh air.

As described herein the phrase "the exhaust port has a first exhaust port and a second exhaust port" includes both cases: a case where there are two exhaust valves and two exhaust ports, and a case where there is/are one exhaust valve or two exhaust valves, each valve having two divided ports.

The exhaust gas at a high temperature is sucked back from the first exhaust port and the secondary air at a low temperature is sucked from the second exhaust port, into the cylinder and therefore a first temperature layer at a high temperature and a second temperature layer at a low temperature can be formed in the cylinder to realize slow combustion even in a high load operation range and prevent knocking. Further, the engine has a structure simpler and more practical than a conventional device in which the intake gas is heated.

The engine includes: a first cylinder, and a second cylinder different in combustion timing from the first cylinder; a blowdown pressure wave supercharging system structured to cause a pressure wave (blowdown pressure wave) from a combustion chamber at opening of the exhaust valves of the first cylinder to act on the exhaust ports of the second cylinder during a reopen period during which the exhaust valves of the second cylinder are reopened; and a secondary air supply system supplying secondary air to the second exhaust port, wherein the reopen period of the exhaust valves of the second cylinder is set from near a bottom dead center of an intake stroke to near a bottom dead center of a compression stroke of the second cylinder and the blowdown pressure wave from the first cylinder acts on the exhaust ports of the second cylinder during the reopen period to introduce the exhaust gas from the first exhaust port into the second cylinder and introduce the secondary air supplied into the second exhaust port by the secondary air supply system into the second cylinder.

The secondary air is supplied into the second exhaust port and the blowdown pressure wave acts on the second exhaust port and the first exhaust port, whereby the exhaust gas at a high temperature can be introduced from the first exhaust port and the secondary air at a low temperature can be introduced from the second exhaust port to form a first temperature layer and a second temperature layer in the cylinder.

The secondary air supply system includes an air pump connected to the second exhaust port via a secondary air supply path, and an open/close control valve interposed in the secondary air supply path, and supplies the secondary air to the second exhaust port during a close period of the exhaust valves. The reopen period of the exhaust valves of the second cylinder is set from near the bottom dead center of the intake stroke to near the bottom dead center of the compression stroke of the second cylinder, and the blowdown pressure wave acts on the exhaust ports of the second cylinder during the reopen period to introduce the exhaust gas from the first exhaust port into the second cylinder and introduce the secondary air supplied into the second exhaust port into the second cylinder from the second exhaust port.

Secondary air can be supplied to the second exhaust port by opening/closing the open/close control valve at an optimal timing and in a desired amount to easily and surely form the first temperature layer and the second temperature layer in the cylinder.

The engine is structured to supply compressed fresh air at a pressure equal to or higher than an exhaust port internal pressure into the cylinders, by including an intake system having a supercharger driven by an electric motor or engine output interposed therein, and by dynamic effects of an intake system and an exhaust system. The secondary air supply system is structured to allow the compressed fresh air supplied from the intake system to flow through to the second exhaust port side to thereby supply the compressed fresh air into the second exhaust port during an EGR overlap period of the intake valve in the intake stroke and the second exhaust valve of the second exhaust port during the reopen period, and wherein the reopen period of the exhaust valves of the second cylinder is set from near the bottom dead center of the intake stroke to near the bottom dead center of the compression stroke of the second cylinder. Also the blowdown pressure wave from the first cylinder acts on the exhaust ports of the second cylinder during the reopen period to introduce the exhaust gas from the first exhaust port into the second cylinder and introduce the secondary air supplied into the second exhaust port into the second cylinder.

The compressed fresh air flows through to the second exhaust port side using the EGR overlap period during which both the intake valve and the second exhaust valve of the second exhaust port are open, to thereby supply the compressed fresh air into the second exhaust port, which is used as secondary air, resulting in a simple structure of the secondary air supply system.

Further, the compressed fresh air at a pressure equal to or higher than an exhaust port internal pressure is supplied into the cylinders by dynamic effects of the intake and exhaust systems, and the compressed fresh air flows through to the second exhaust port side from the intake port side using the EGR overlap period during which both the intake valve and the second exhaust valve are open, to thereby supply the fresh air into the second exhaust port, which is used as secondary air, so that the secondary air supply system can be made simpler without the supercharger or the secondary air pump, while supplying the secondary air.

A reopen start time of the second exhaust valve is set to be earlier than a close time of the intake valve and a reopen start time of the first exhaust valve is set to be later than the reopen start time of the second exhaust valve, and the blowdown pressure wave from the first cylinder acts on the exhaust ports of the second cylinder during the reopen periods of the first exhaust valve and the second exhaust valve of the second cylinder.

Though the reopen start time of the first exhaust valve is set to be later than the reopen start time of the second exhaust valve here, and is more desirably set to be substantially after the intake valve is closed.

The reopen start time of the second exhaust valve of the second cylinder is set to be earlier than the close time of the intake valve, and thus the compressed fresh air can be supplied into the second exhaust port during the overlap period of both valves and used as secondary air. Further, the reopen start time of the first exhaust valve is set to be later than the reopen start time of the second exhaust valve, and thus the fresh air is not supplied much to the first exhaust port side. Consequently, the first temperature layer can be formed on the first exhaust port side and the second temperature layer can be formed on the second exhaust port side, and the temperature difference between the temperature layers can be made large.

A mask member to restrain flow of the sucked back exhaust gas to the intake valve side is provided on an opening on the combustion chamber side of the exhaust port.

The mask member to restrain flow of the exhaust gas to the intake valve side is provided, whereby mixture of the exhaust gas and the fresh air in the cylinder can be suppressed to make the temperature difference between the first temperature layer and the second temperature layer larger and clear.

A combustion control is conducted by controlling a valve open period of the open/close control valve for each cylinder or each cycle.

The supply amount of the secondary air is controlled for each cylinder or each cycle, and thus the compression temperature can be adjusted by the secondary air amount to control the ignition temperature, the speed of slow combustion, and the combustion temperature.

The engine includes a first fuel injection valve supplying fuel to the first temperature layer and a second fuel injection valve supplying fuel to the second temperature layer, wherein a ratio of the fuels injected from the first, second fuel injection valves is controlled.

The ratio of the fuel amount injected to the first temperature layer and the fuel amount injected to the second temperature layer is controlled, and thus controls of the ignition time, the speed of slow combustion, and the combustion temperature can be realized.

Figure 1:
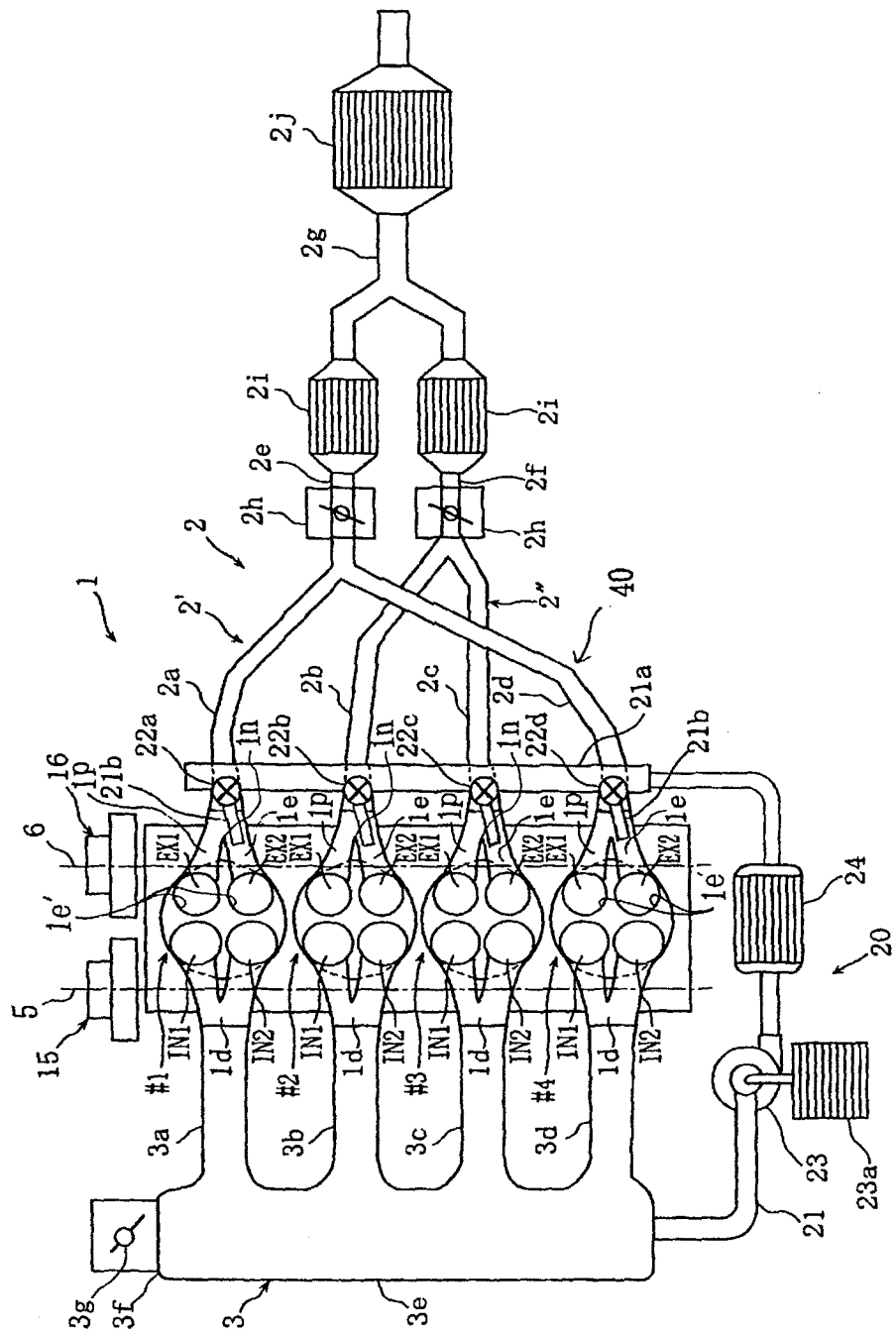
FIG. 1 is a schematic structural view of an engine according to a first embodiment of the present invention.

EXPLANATION OF NUMERALS AND SYMBOLS 1 four-cycle engine
1a cylinder bore (cylinder)
1d intake port
1e second exhaust port
1p first exhaust port
3 intake device (intake system)
13 first, second fuel injection valves
20 secondary air supply system
21 secondary air supply path
22a to 22d open/close control valve
23 auxiliary supercharger (air pump)
31 main supercharger
40 blowdown pressure wave supercharging system
50 mask member
IN1, IN2 intake valve
EX1, EX2 exhaust valve
T1 first temperature layer
T2 second temperature layer
1 second cylinder
4 first cylinder

BEST MODE FOR CARRYING OUT THE INVENTION

Hereinafter, embodiments of the present invention will be described based on the attached drawings.

Figure 2:
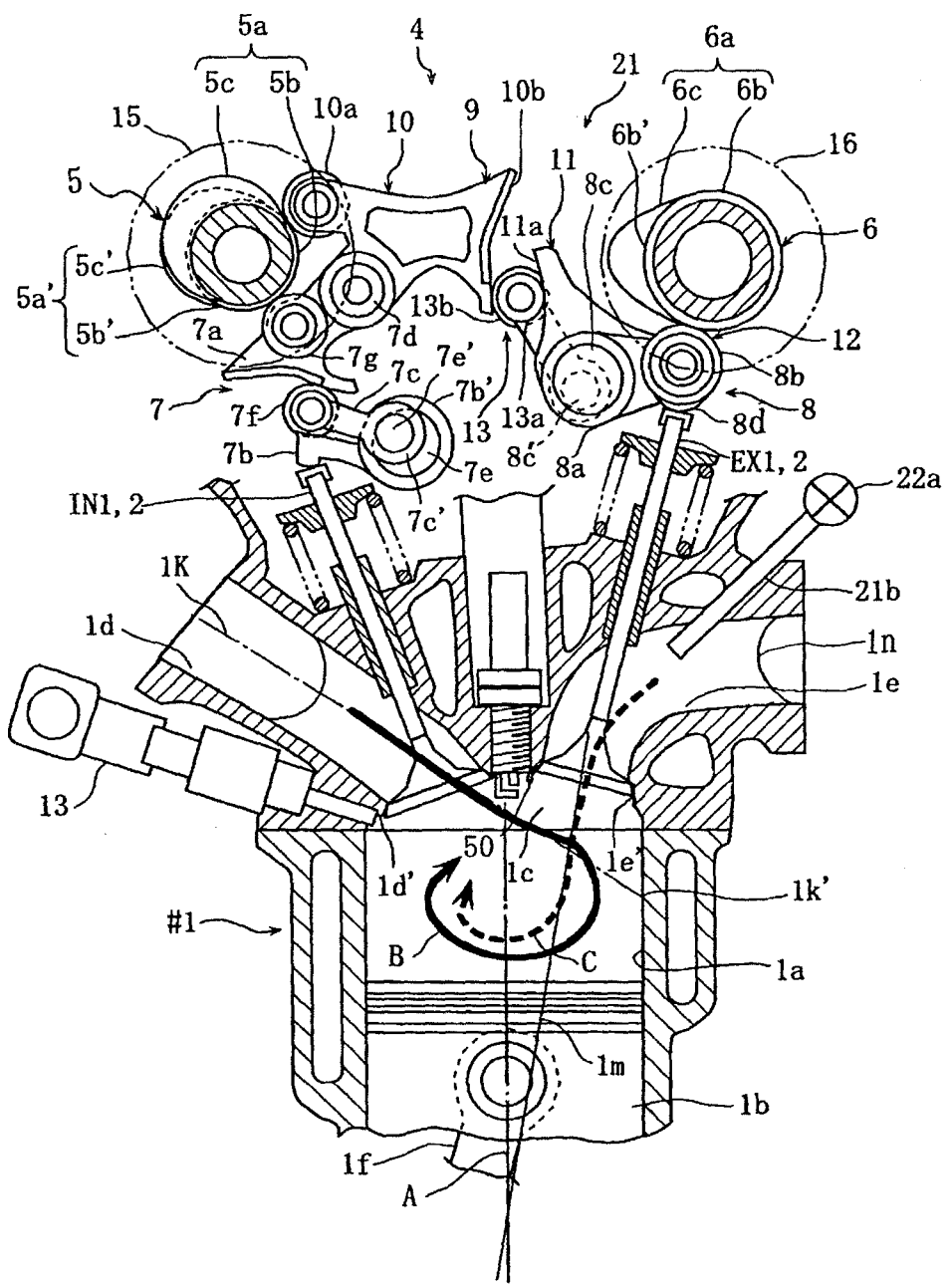
FIG. 2 is a cross-sectional side view of the engine of the first embodiment.
Figure 3:
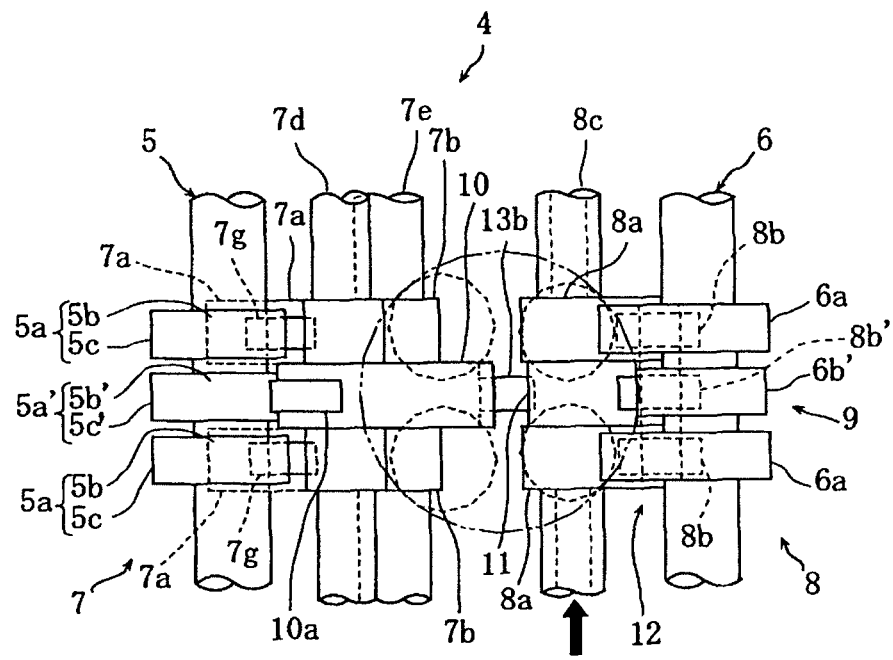
FIG. 3 is a schematic plan view of a valve device of the engine of the first embodiment.
Figure 4:
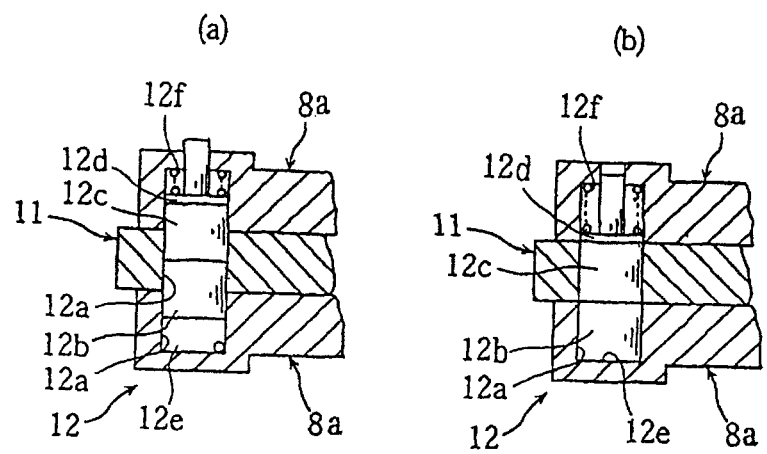
FIG. 4 are schematic cross-sectional plan views of a switching system of the engine of the first embodiment.
Figure 5:
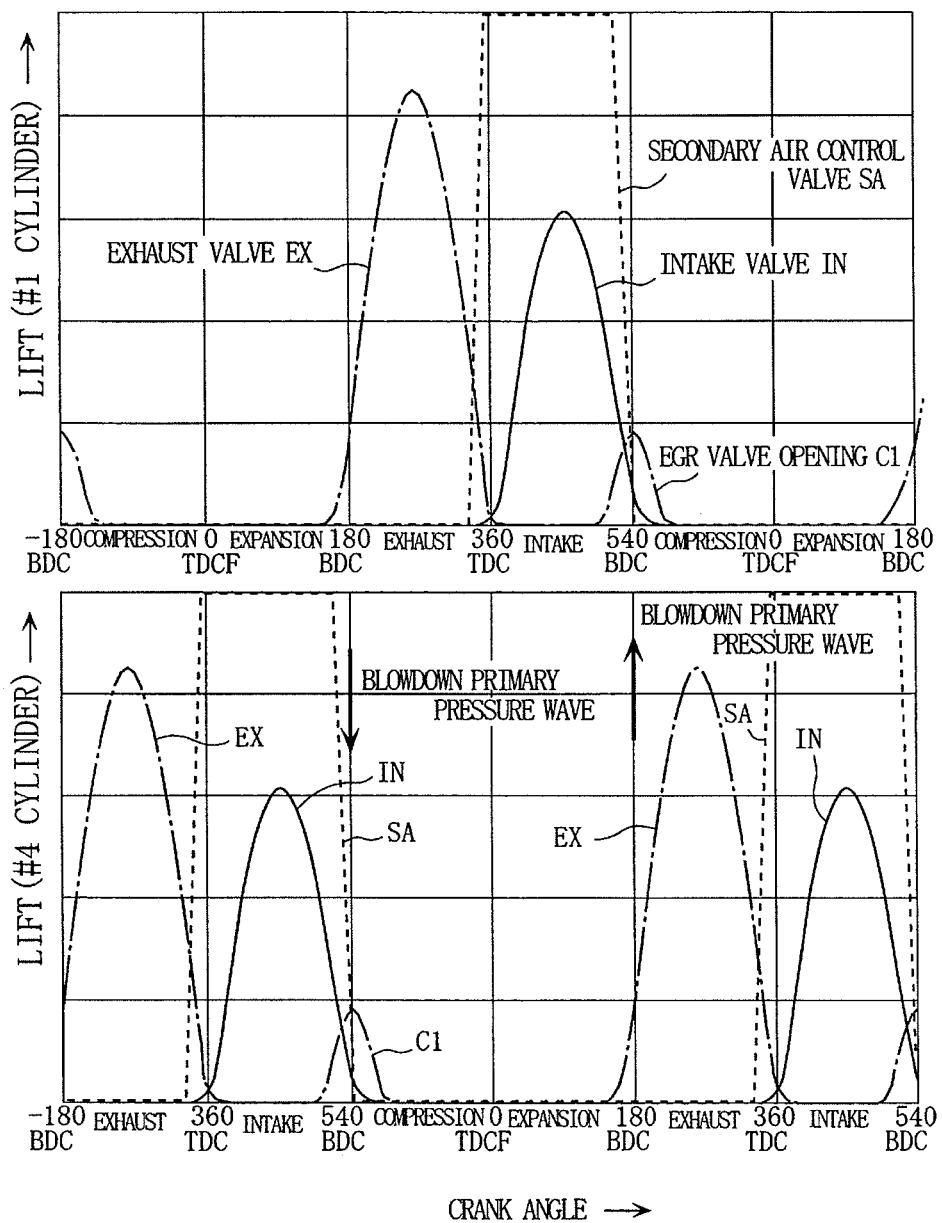
FIG. 5 is a graph showing timings of opening/closing of intake valves, exhaust valves, and a secondary air control valve of the engine of the first embodiment.
Figure 6:
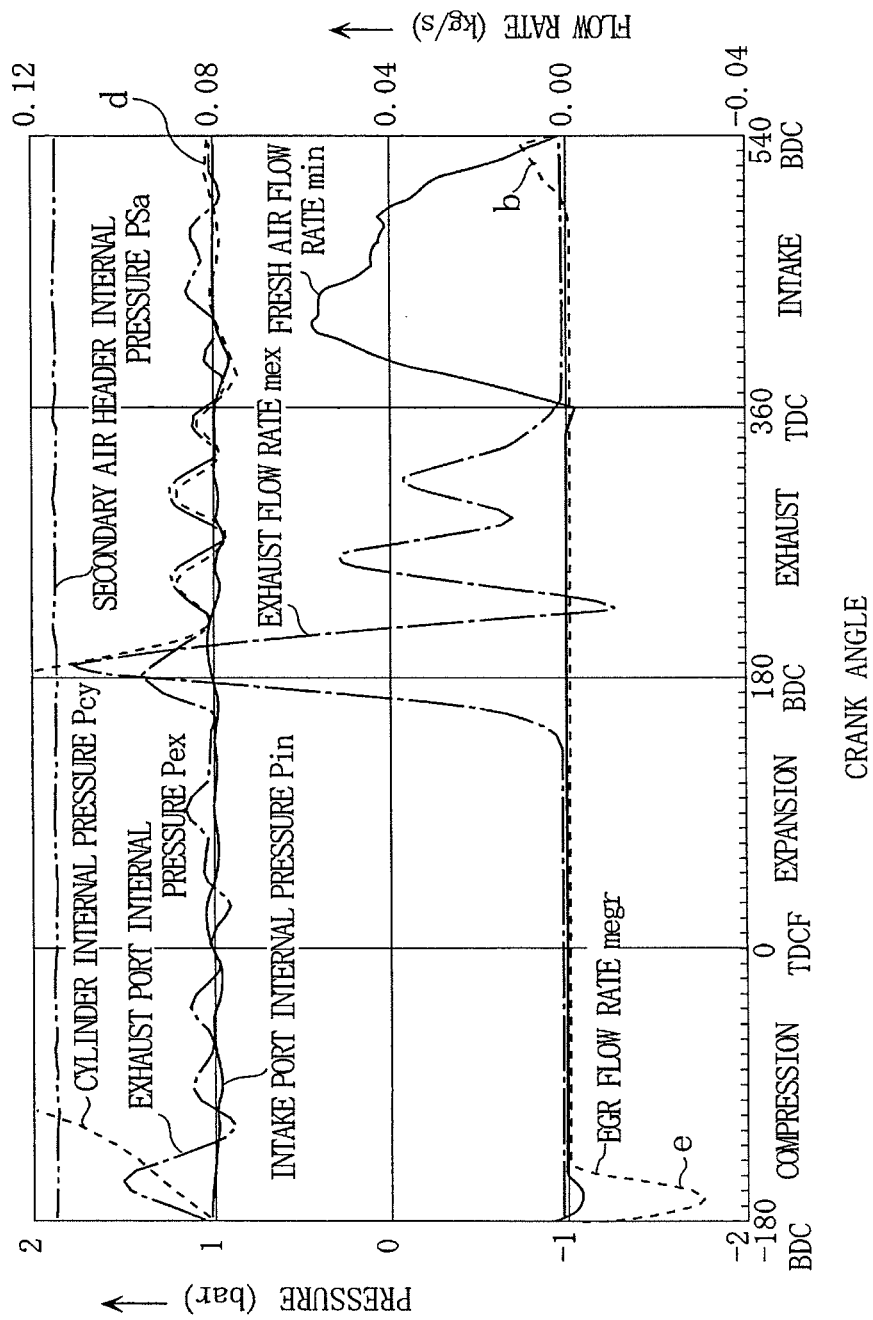
FIG. 6 is a characteristic graph of various pressures and flow rates of the engine of the first embodiment.
Figure 7:
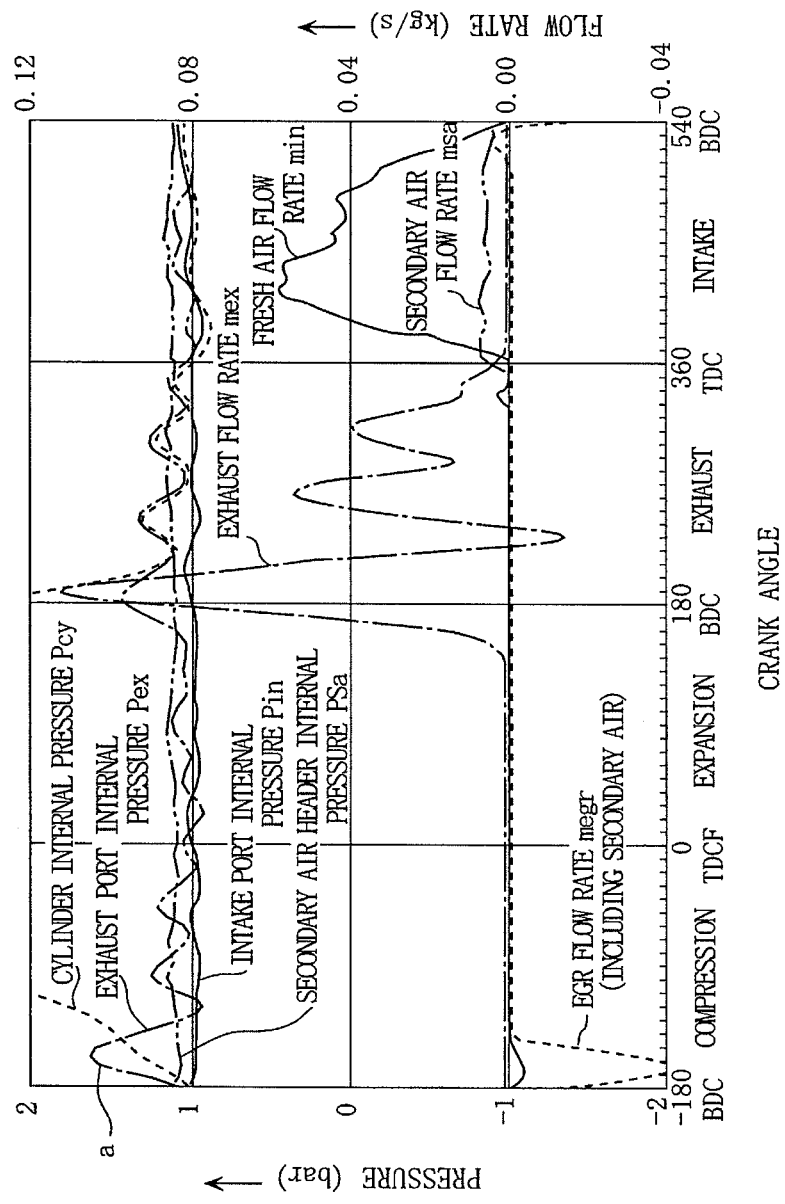
FIG. 7 is a characteristic graph of various pressures and flow rates of the engine of the first embodiment.

FIG. 1 to FIG. 7 are views for describing a four-cycle engine according to a first embodiment of the present invention. FIG. 1 is an overall structural view. FIG. 2 is a cross-sectional side view of this engine. FIG. 3 is a schematic plan view of a valve system. FIG. 4 are schematic views of a switching system. FIG. 5 to FIG. 7 are graphs for describing operations.

In the drawings, numeral 1 denotes an HCCI engine based on a four-cylinder, four-valve DOHC gasoline engine. This engine 1 includes #1 cylinder to #4 cylinder. The #1 cylinder to #4 cylinder each have four valves in total: two intake valves IN1, IN2 and two exhaust valves EX1, EX2. Further, the engine 1 includes in-cylinder gasoline injection valves 13, and has a compression ratio set to 12 which is optimal for spark ignition combustion.

The order of ignition in the engine 1 is #1-#3-#4-#2 cylinders. The phase between the cylinders (ignition interval) is 180 degrees in crankshaft angles. Therefore, the phase between the #1 cylinder and the #4 cylinder and the phase between the #2 cylinder and the #3 cylinder are 360 degrees each. Note that the piston positions of the #1 cylinder and the #4 cylinder are always the same, and the piston positions of the #2 cylinder and the #3 cylinder are always the same. The piston positions of the #1 cylinder and the #4 cylinder are different by 180 degrees from the piston positions of the #2 cylinder and the #3 cylinder.

The specific structure of the engine 1 will be described. In a cylinder bore 1a of each of the #1 to #4 cylinders, a piston 1b is inserted slidably, and to the piston 1b is coupled to a crankshaft (not shown) by a connecting rod 1f. In a combustion chamber 1c located above the cylinder bore 1a, there open two intake valve openings 1d' of an intake port 1d, and two exhaust valve openings 1e' of exhaust ports 1e, 1p. These openings are opened/closed by the first, second intake valves IN1, IN2 and the first, second exhaust valves EX1, EX2.

The intake valve openings 1d', 1d' for the first, second intake valves extend by the bifurcated intake port 1d toward a cylinder head front wall and open in the front wall.

Further, the opening 1e' for the first exhaust valve EX1 extends by a first exhaust port 1p toward a cylinder head rear wall and the opening 1e' for the second exhaust valve EX2 extends by a second exhaust port 1e to the cylinder head rear wall, and they merge together at a midpoint and open in the rear wall. The first exhaust port 1p and the second exhaust port 1e are divided by a partition wall 1n, and a volume of a portion surrounded by the partition wall 1n and peripheral wall of the exhaust port is a volume of later-described secondary air stored in the second exhaust port. Note that the partition wall may be provided also in the exhaust pipe, whereby the volume of the secondary air can be increased.

The intake valves IN1, IN2 and the exhaust valves EX1, EX2 are driven to open/close by a valve device 4. This valve device 4 has an intake valve drive system 7 capable of sequentially changing open periods and lift amounts of the intake valves IN1, IN2, and an exhaust valve drive system 8 for opening/closing the exhaust valves EX1, EX2.

The exhaust valve drive system 8 includes an exhaust cam shaft 6 and an exhaust rocker shaft 8c which are arranged in parallel to the crankshaft, exhaust rocker arms 8a, 8a pivotally and rockably supported by the exhaust rocker shaft 8c, and rollers 8b pivotally supported on tip portions of the rocker arms 8a. On the exhaust cam shaft 6, exhaust cam noses 6a each having a base circular portion 6b and a lift portion 6c are formed corresponding to the exhaust valves.

Rotation of the exhaust cam shaft 6 causes the exhaust cam noses 6a to rock the rocker arms 8a vertically via the rollers 8b, and tip portions 8d of the rocker arms 8a push down the exhaust valves EX in an opening direction.

The intake valve drive system 7 includes an intake cam shaft 5, an intake rocker shaft 7e, and a support shaft 7d which are arranged in parallel to the crankshaft, rocker cams 7a supported rockably by the support shaft 7d, and intake rocker arms 7b driven rockably by the rocker cams 7a via intake control arms 7c. On the intake cam shaft 5, intake cam noses 5a are formed corresponding to the intake valves of each of the cylinders. The intake cam noses 5a each have a base circular portion 5b and a lift portion 5c.

A base end portion 7b' in a ring shape of each intake rocker arm 7b is pivotally supported by the intake rocker shaft 7e. A base end portion 7c' in a ring shape of each intake control arm 7c is pivotally supported by an arm support shaft 7e' eccentric from the axial center of the intake rocker shaft 7e. When the intake rocker shaft 7e is rotated, the intake control arms 7c move forward and backward. This changes the start position of slide contact of rollers 7f at tip portions with the rocker cams 7a, and thereby changes the open periods and lift amounts of the intake valves.

When the intake cam shaft 5 is rotated, the intake cam noses 5a of the intake cam shaft 5 rock the intake rocker arms 7b vertically via the rocker cams 7a and the intake control arms 7c, and tip portions of the intake rocker arms 7b push down the intake valves IN1, IN2 in an opening direction.

Here, each intake port 1d has a shape and so on set so as to generate a fresh air tumble flow B such that, as shown by a bold solid line in FIG. 2, an intake air flow (fresh air flow) flows into the exhaust valve side across a cylinder axis A and flows down along the cylinder axis A on the exhaust valve side, and turns around on top of the piston and ascends on the intake valve side. Specifically, when seen in the cam shaft direction, each intake port 1d is formed in a substantially linear shape, and a center axis 1k thereof is directed to a portion 1k' near the exhaust valve openings across the cylinder axis A on an inner peripheral face of the cylinder bore 1a, thereby directing the fresh air flow to the exhaust valve side.

In addition, a mask 50 is provided at each of portions of the exhaust ports 1p, 1e so as to generate an exhaust tumble flow C such that, as shown by a bold solid dashed line in FIG. 2, an exhaust gas reverse flow (EGR gas flow) or secondary air flows down along the cylinder axis A on the exhaust valve side, and turns around on top of the piston and ascends on the intake valve side. Note that the region provided with the mask 50 will be described later using FIG. 21.

An intake device 3 connected to the engine 1 has a surge tank 3e having a predetermined volume and branch pipes 3a to 3d branched from the surge tank 3e and connected to the respective intake ports 1d of the #1 cylinder to #4 cylinder. An intake throttle valve 3g is disposed on an intake port 3f formed on one end of the surge tank 3e. An air cleaner (not shown) is connected upstream of the intake throttle valve 3g.

Further, an exhaust system 2 connected to the engine 1 has branch pipes 2a, 2d, 2b, 2c of the respective cylinders with lengths being set relatively long, and is what is called a 4-2-1 exhaust system having a first exhaust system 2' coupling and exhausting the #1 cylinder and the #4 cylinder with the phase (ignition interval) of 360 degrees, and a second exhaust system 2" coupling and exhausting the #2 cylinder and the #3 cylinder with the phase of 360 degrees similarly. This system allows to avoid exhaust interference in a high load operation range, and thus is suitable for increasing output.

The first exhaust system 2' has the first, fourth branch pipes 2a, 2d connected to external openings of the exhaust ports of the #1 cylinder and the #4 cylinder, and a first merging pipe 2e merging the branch pipes 2a, 2d. The second exhaust system 2" has the second, third branch pipes 2b, 2c connected to the exhaust ports 1e of the #2 cylinder and the #3 cylinder, and a second merging pipe 2f merging the branch pipes 2b, 2c. Then the first, second merging pipes 2e, 2f merge with a main pipe 2g.

Further, upstream catalysts 2i, 2i are interposed in the first, second merging pipes 2e, 2f respectively, and a downstream catalyst 2j is interposed in the main pipe 2g. Moreover, exhaust throttle valves 2h, 2h variably controlling an exhaust port area are interposed upstream of the upstream catalysts 2i in the first, second merging pipes 2e, 2f respectively.

The engine of this embodiment has a blowdown pressure wave supercharging system 40 causing a combustion chamber internal pressure wave (exhaust blowdown pressure wave) near the expansion stroke bottom dead center of the #4 cylinder (first cylinder) to act on the first, second exhaust ports 1p, 1e near the intake stroke bottom dead center of the #1 cylinder (second cylinder) which is different from the #4 cylinder in combustion timing by 360 degrees and reopening the exhaust valves EX1, EX2 of the #1 cylinder, and a secondary air supply system 20 supplying secondary air to the second exhaust port 1e of the #1 cylinder and storing the secondary air in the second exhaust port 1e prior to arrival of the exhaust blowdown pressure wave at the #1 cylinder. The engine is structured to supercharge EGR gas at a high temperature from the first exhaust port 1p into the combustion chamber and supercharge gas mainly containing the secondary air stored in the second exhaust port 1e and a small amount of EGR gas into the #1 cylinder by the exhaust blowdown pressure wave from the #4 cylinder.

In addition, the blowdown pressure wave supercharging system 40 and the secondary air supply system 20 are structured to supercharge secondary air and EGR gas into the #4 cylinder using the exhaust blowdown pressure wave from the #1 cylinder, and further structured to supercharge secondary air and EGR gas into the #3 cylinder using the exhaust blowdown pressure wave from the #2 cylinder and to supercharge conversely secondary air and EGR gas into the #2 cylinder using the exhaust blowdown pressure wave from the #3 cylinder. The relationship between the #1 cylinder and the #4 cylinder will be described in detail below.

The blowdown pressure wave supercharging system 40 is realized by shifting the combustion timing by 360 degrees between the #1 cylinder and the #4 cylinder, setting the lengths of the exhaust branch pipes 2a, 2d between the both cylinders so that the exhaust blowdown pressure wave from the #4 cylinder reaches the first, second exhaust ports of the #1 cylinder near the intake stroke bottom dead center of the #1 cylinder, and further having an EGR valve opening system 9 which opens the exhaust valves EX1, EX2 of the #1 cylinder again by the intake cam shaft 5, as shown by a lift curve C1 in FIG. 5, near the bottom dead center of an intake stroke of the #1 cylinder.

The EGR valve opening system 9 has an EGR cam nose 5a' formed on the intake cam shaft 5, an exhaust rocker cam 10 pivotally supported by the support shaft 7d, an intermediate lever 11 pivotally supported by the exhaust rocker shaft 8c, an exhaust control arm 13 pivotally supported by an arm support shaft 8c' which is eccentric from the shaft center of the exhaust rocker shaft 8c, and an EGR guide cam 6b' formed on the exhaust cam shaft 6.

The EGR cam nose 5a' on the intake cam shaft 5 side is formed between two intake cam noses 5a, 5a of the intake cam shaft 5. This EGR cam nose 5a' has an EGR base circular portion 5b' with the same diameter as that of the base circular portion 5b on the intake side, and an EGR lift portion 5c' with a smaller lift amount than that of the lift portion 5c on the intake side.

Further, the EGR guide cam 6b' on the exhaust cam shaft 6 side has the same diameter as that of the base circular portion 6b of the exhaust cam nose 6a. Incidentally, this EGR guide cam 6b' is formed of only a base circular portion and has no lift portion.

A roller 10a is disposed on one side across the support shaft 7d of the exhaust rocker cam 10, and a cam face 10b is formed on the other side thereof. The roller 10a is in rotary contact with the EGR cam nose 5a', and a roller 13b of the exhaust control arm 13 is in rotary contact with the cam face 10b.

The intermediate lever 11 forms a substantially triangle shape, and a vertex angle portion of this triangle is supported rockably by the exhaust rocker shaft 8c. Further, rollers 8b are pivotally supported by one base angle portion of the triangle, and a cam face 11a is formed on an oblique side continuous to the other base angle portion. The rollers 8b are in rotary contact with the EGR guide cam 6b', and a press portion 13a formed on a tip of the exhaust control arm 13 is in slide contact with the cam face 11a.

Here, between the intermediate lever 11 and two exhaust rocker arms 8a, 8a, there is formed a switching system 12 capable of switching to one of an EGR valve opening ON state in which rocking of the intermediate lever 11 is transmitted to the exhaust rocker arms 8a, 8a, and an EGR valve opening OFF state in which the rocking is not transmitted.

The switching system 12 has a structure in which, as shown in FIG. 4, a coupling hole 12a is concentrically formed in a tip portion of the intermediate lever 11 and tip portions of the exhaust rocker arms 8a, 8a, and coupling pistons 12b, 12c are arranged in the coupling hole 12a to be slidable in the axial direction and relatively movable in an axially orthogonal direction.

Further, one end face of the coupling piston 12b and one end of the coupling hole 12a form an oil pressure chamber 12e. A return spring 12f is disposed between the other end face of the coupling piston 12c and the other end of the coupling hole 12a with a stopper 12d being interposed therebetween. To the oil pressure chamber 12e, an oil pressure can be supplied via an oil pressure path 8d formed in the rocker shaft 8c.

When the oil pressure is supplied to the oil pressure chamber 12e, the coupling pistons 12c, 12b are located at positions crossing boundaries between the intermediate lever 11 and the exhaust rocker arms 8a (FIG. 4A), thereby turning to the EGR valve opening ON state. Then, when the oil pressure is released, contact portions between the coupling piston 12c and the coupling piston 12b and the stopper 12d match the boundaries (FIG. 4B), thereby turning to the EGR valve opening OFF state.

Moreover, the intake cam shaft 5 has an intake cam phase variable system 15 capable of freely controlling the phase of the intake cam shaft 5. When the phase of the intake cam shaft 5 is changed, open/close times of the intake valves IN1, IN2 in an intake stroke change, and simultaneously, open/close times of the exhaust valves EX1, EX2 in the EGR valve opening operation also change by the same phase. Further, the exhaust cam shaft 6 has an exhaust cam phase variable system 16 capable of freely controlling the phase of the exhaust cam shaft 6.

The secondary air supply system 20 includes a secondary air supply path 21 connecting the surge tank 3e and the second exhaust ports 1e of the respective cylinders in a communicative manner, secondary air control valves 22a to 22d interposed in the secondary air supply path 21, and an electric motor driven auxiliary supercharger (air pump) 23 interposed upstream of the secondary air control valves in the secondary air supply path 21. In addition, numeral 23a denotes a drive motor, and numeral 24 denotes an intercooler which cools fresh air that is increased in temperature by compression.

The secondary air supply path 21 has a header part 21a extending in an arrangement direction of the cylinders, and branch pipes 21b arranged to open in the second exhaust ports 1e of the respective cylinders from the header part 21a. The secondary air control valves 22 are interposed in the branch pipes 21b respectively. Therefore, when the secondary control valves 22 are opened, the secondary air in the header part 21a is supplied to and stored in the second exhaust ports 1e.

Note that a volume about equal to that of the second exhaust port 1e of the secondary air is supplied, but a volume over that of the second exhaust port 1e of the secondary air may be supplied. When a volume over that of the second exhaust port 1e of the secondary air is supplied, the secondary air is supplied also to the first exhaust port side. A total amount is accordingly increased by the secondary air added to the fresh air from the intake port, and the HCCI operable range can be widened. Further, the temperature on the high temperature side is lowered when the secondary air is increased, thus providing a great effect of controlling the ignition time. However, unless the secondary air exceeds the volume of the second exhaust port, the temperature does not change to fail to control the first ignition time. Note that the combustion speed can be controlled.

A situation will be described in detail that secondary air and EGR gas are supercharged into the #1 cylinder (corresponding to a second cylinder of the present invention) using an exhaust blowdown pressure wave from the #4 cylinder (corresponding to a first cylinder of the present invention).

FIG. 5 shows lift curves EX, IN of the exhaust valves and the intake valves of the #1 cylinder and the #4 cylinder, lift curves C1 when the exhaust valves are opened again by the EGR valve opening system 9, and lift curves SA of the secondary air control valves. As shown in FIG. 5, the secondary air control valves open in the intake stroke of each cylinder, and the exhaust valves open near the intake stroke bottom dead center of each cylinder by the EGR valve opening system.

Further, FIG. 6 and FIG. 7 are characteristic graphs showing changes of a flow rate megr of the EGR gas from the first exhaust port 1p into the cylinder bore, a flow rate msa of the secondary air into the second exhaust port 1e, a flow rate mex of exhaust gas out to the exhaust ports, and a flow rate min of fresh air (intake air) into the cylinder bore according to the crank angle, as well as changes of a cylinder internal pressure pcy, an exhaust port internal pressure pex, and an intake port internal pressure pin according to the crank angle. FIG. 6 shows characteristics of the secondary air control valves 22a to 22d when retained in a closed state, and FIG. 7 shows characteristics of the secondary air control valves when opened/closed at the aforementioned timings.

In the engine 1 of this embodiment, in a predetermined operation range (HCCI operation range) in which the EGR gas should be supercharged, an oil pressure is supplied to the oil pressure chamber 12e of the above-described switching system 12, and the coupling pistons 12b, 12c move to positions of FIG. 4A. Thus, the EGR cam nose 5a' of the intake cam shaft 5 drives the exhaust valves EX1, EX2 to open or close. More particularly, when the lift portion 5c' of the EGR cam nose 5a' rocks the exhaust rocker cam 10 via the roller 10a, this rocking is transmitted to the intermediate lever 11 via the roller 13b to rock the exhaust rocker arms 8a together with the intermediate lever 11. Thus, the exhaust valves EX1, EX2 open or close along the EGR valve opening lift curves C1 shown in FIG. 5.

Incidentally, in an operation range in which supercharging of EGR gas is not performed, the supply of the oil pressure is stopped, the coupling pistons 12b, 12c move to the positions in FIG. 4B, and rocking of the intermediate lever 11 is not transmitted to the exhaust rocker arms 8a. Therefore, the exhaust valves do not perform the EGR valve opening operation.

In this embodiment, the EGR valve opening system 9 does not operate at any time in a high-rotation range. Accordingly, valve acceleration by the EGR cam nose 5a' can be set high. The EGR cam nose 5a' has a narrow opening degree, but relatively high lift is set thereto, allowing a large amount of EGR gas to be introduced in a short time.

In this embodiment, the secondary air is supplied by the auxiliary supercharger 23 to the header part 21a at a pressure higher than the exhaust port internal pressure, for example, at 1.2 bar to 1.8 bar. In the HCCI operation range in which EGR gas is supercharged, the secondary air control valve 22a of the #1 cylinder opens in the intake stroke of the #1 cylinder as shown by the secondary air control valve SA in FIG. 5, the compressed secondary air is supplied to the second exhaust port 1e of the #1 cylinder (see the secondary air flow rate msa in FIG. 7), and the secondary air is stored in the second exhaust port 1e. In this case, when the #1 cylinder approaches the intake bottom dead center, the exhaust valves of the #4 cylinder start to open near the expansion stroke bottom dead center, the exhaust blowdown pressure wave from the #4 cylinder is emitted to the exhaust system, and this exhaust blowdown pressure wave proceeds to the #1 cylinder side (see FIG. 5) via the exhaust branch pipes 2d, 2a set to the specific lengths. At this time, for the #1 cylinder, the EGR valve opening system 9 opens the exhaust valves again near the intake stroke bottom dead center as shown by the EGR valve opening C1. The aforementioned exhaust blowdown pressure wave reaches the first, second exhaust ports 1p, 1e of the #1 cylinder as shown at point a of the exhaust port internal pressure pex in FIG. 7 at the same timing as reopening of the exhaust valves, and the secondary air stored in the second exhaust port 1e and the EGR gas in the first exhaust port 1p are pushed by this exhaust blowdown pressure wave into the cylinder bore 1a of the #1 cylinder.

Figure 8:
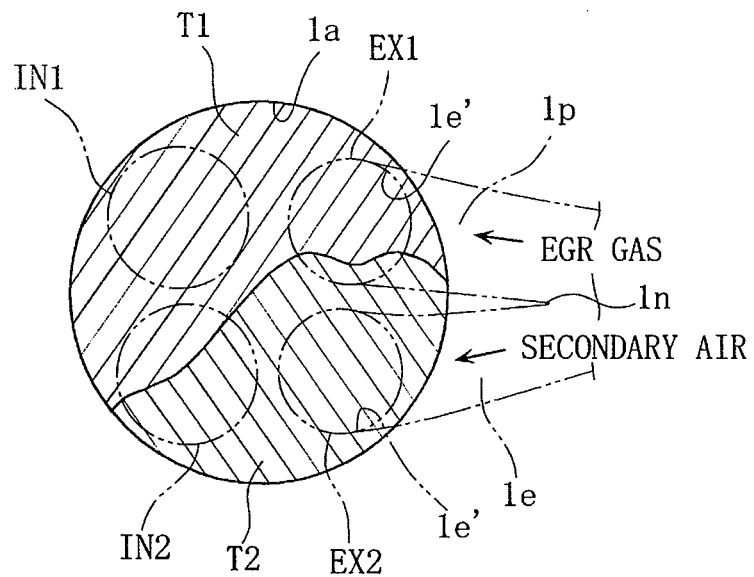
FIG. 8 is a view schematically showing a temperature stratification of the engine of the first embodiment.

Thus, as shown in FIG. 8, a first temperature layer T1 at a high temperature composed of the EGR gas introduced from the first exhaust port 1p is formed on the first exhaust port 1p side in the cylinder bore 1a, and a second temperature layer T2 at a temperature lower than that of the first temperature layer T1 composed of mainly the secondary air introduced from the second exhaust port 1e and a small amount of EGR gas is formed on the second exhaust port 1e side. Note that the temperature layers T1, T2 in FIG. 8 are shown in the state where the piston is located near 80 degrees after the bottom dead center in the compression stroke.

As described above, the EGR gas at a high temperature is supplied from the first exhaust valve side and the secondary air at a low temperature is supplied from the second exhaust valve side, so that a temperature stratification composed of the first temperature layer T1 and the second temperature layer T2 can be formed to restrain a rapid rise of the combustion temperature.

Figure 9:
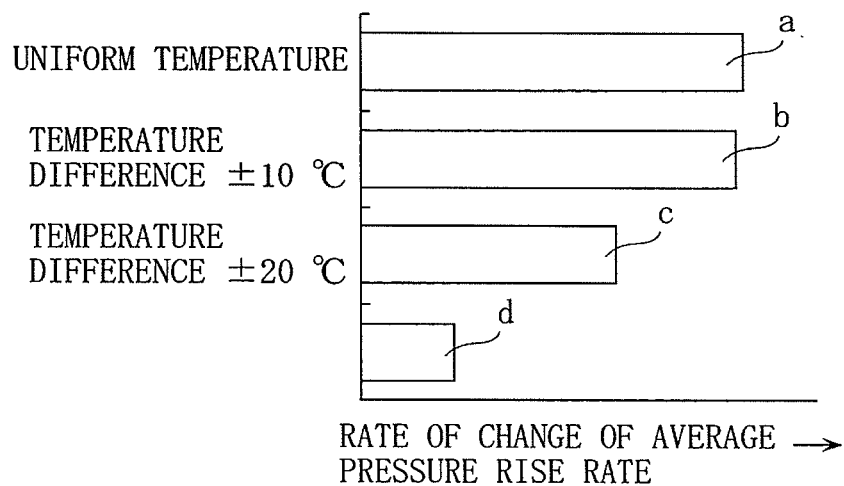
FIG. 9 is a graph showing the relation between the temperature difference and the rate of change of the average pressure rise rate for explaining the effect of the temperature stratification in the engine of first embodiment.

FIG. 9 shows the relation between the maximum temperature difference in the cylinder bore and the rate of change of the average pressure rise rate in the combustion chamber. The rate of change barely lowers in the case b of the maximum temperature difference of 20° C. as compared to the case a of uniform temperature. Further, the rate of change slightly lowers in the case c of the maximum temperature difference of 40° C. On the other hand, it is found that the rate of change of the average pressure rise rate significantly lowers in the case d of the maximum temperature difference of 40° C. set by decreasing the average temperature by 10° C. Note that a temperature decrease in the average temperature by 10° C. when a uniform temperature is kept in the cylinder bore causes no heat generation. However, it is considered that if there is a temperature distribution in the cylinder bore, heat is first generated at a portion at a higher temperature and then combustion occurs in the whole region due to compression and temperature rise of the other region by expansion caused by the heat generation.

As shown in FIG. 6, during an overlap period of the intake valves and the EGR valve opening of the exhaust valves, the intake port internal pressure pin is slightly higher than the exhaust port internal pressure pex (see point d in FIG. 6) due to dynamic effects of the intake/exhaust pipes. Thus, a small amount of fresh air is supplied to the exhaust port via the cylinder bore (see point b of the EGR flow rate megr in FIG. 6).

Incidentally, with the EGR flow rate megr, a positive side portion like the point b indicates flowing out of the cylinder side to the exhaust port, and a negative side portion like point e indicates flowing from the exhaust port into the cylinder bore.

Further, as shown in FIG. 7, by opening of the secondary air control valve 22a of the #1 cylinder in an intake stroke, secondary air is introduced into the exhaust port 1e of the #1 cylinder and stored therein (see intake stroke of the secondary air flow rate msa in FIG. 7). By subsequent reopening of the exhaust valves by the EGR valve opening system 9, the secondary air is introduced into the cylinder bore together with EGR gas (see the EGR gas flow rate megr in FIG. 7). Due to such addition of secondary air to fresh air, the amount of low-temperature air increases, and the high-temperature EGR gas is increased so that the increased low-temperature air becomes the temperature corresponding to compression ignition. Thus, in comparison with the case where no secondary air is introduced (see FIG. 6), the mass (thermal capacity) of in-cylinder air-fuel mixture increases, and the combustion temperature lowers. As a consequence, the fuel injection amount restricted for suppressing NOx can be increased, and hence the torque can be increased. Incidentally, to secure the amount of high-temperature EGR gas needed for compression ignition, the exhaust path can be narrowed by, for example, about ½ in cross-sectional area with the exhaust throttle valve 2h, to thereby increase the high-temperature EGR amount. However, narrowing the exhaust path area causes the pumping loss to increase slightly, and thus it is further desirable that the high-temperature EGR gas amount is secured by contriving the valve timing, such as lengthening the EGR open period of the exhaust valves.

Figure 10:
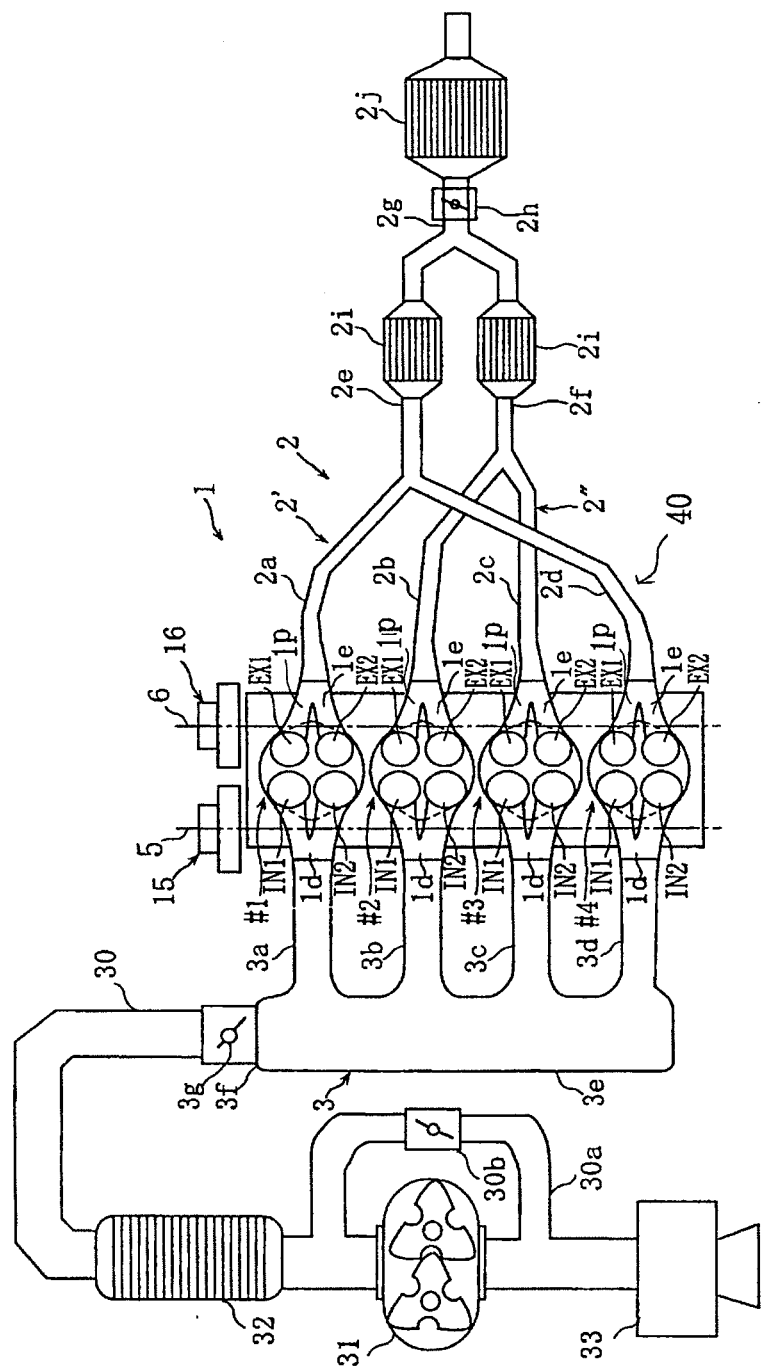
FIG. 10 is a schematic structural view of an engine of a second embodiment of the present invention.
Figure 11:
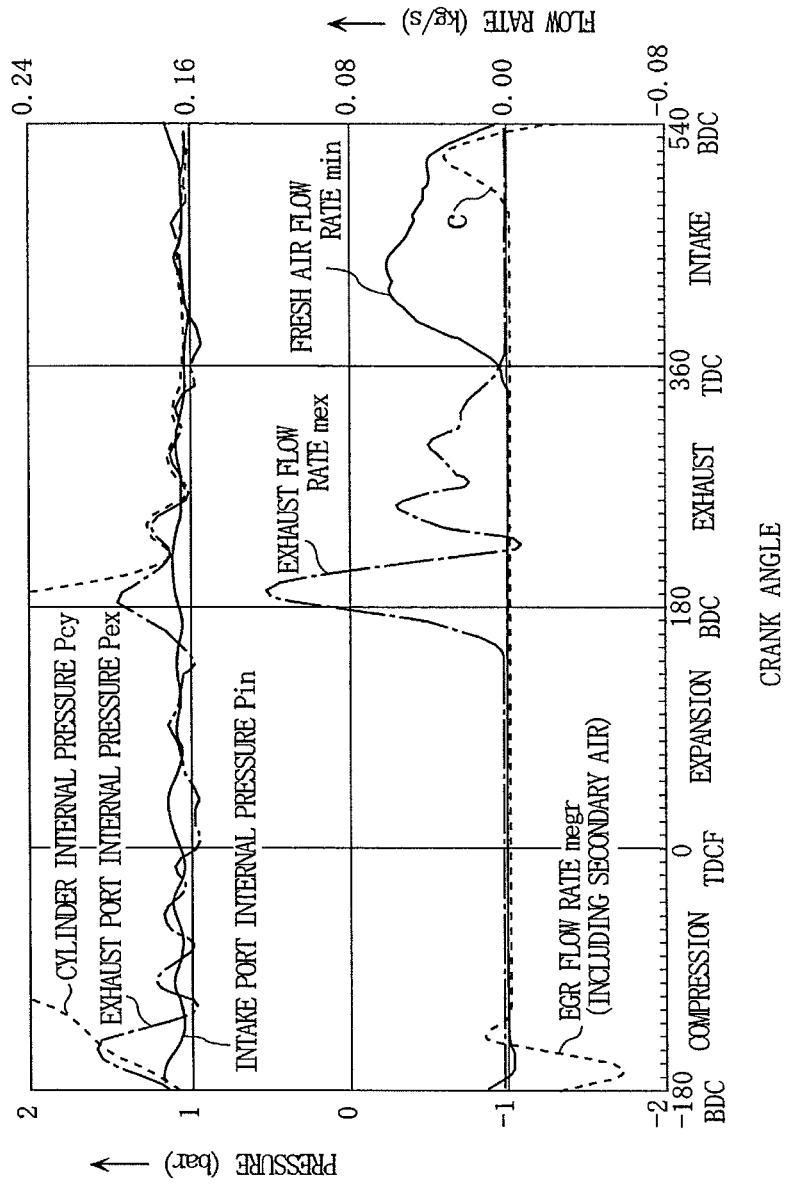
FIG. 11 is a characteristic graph of various pressures and flow rates of the engine of the second embodiment.
Figure 12:
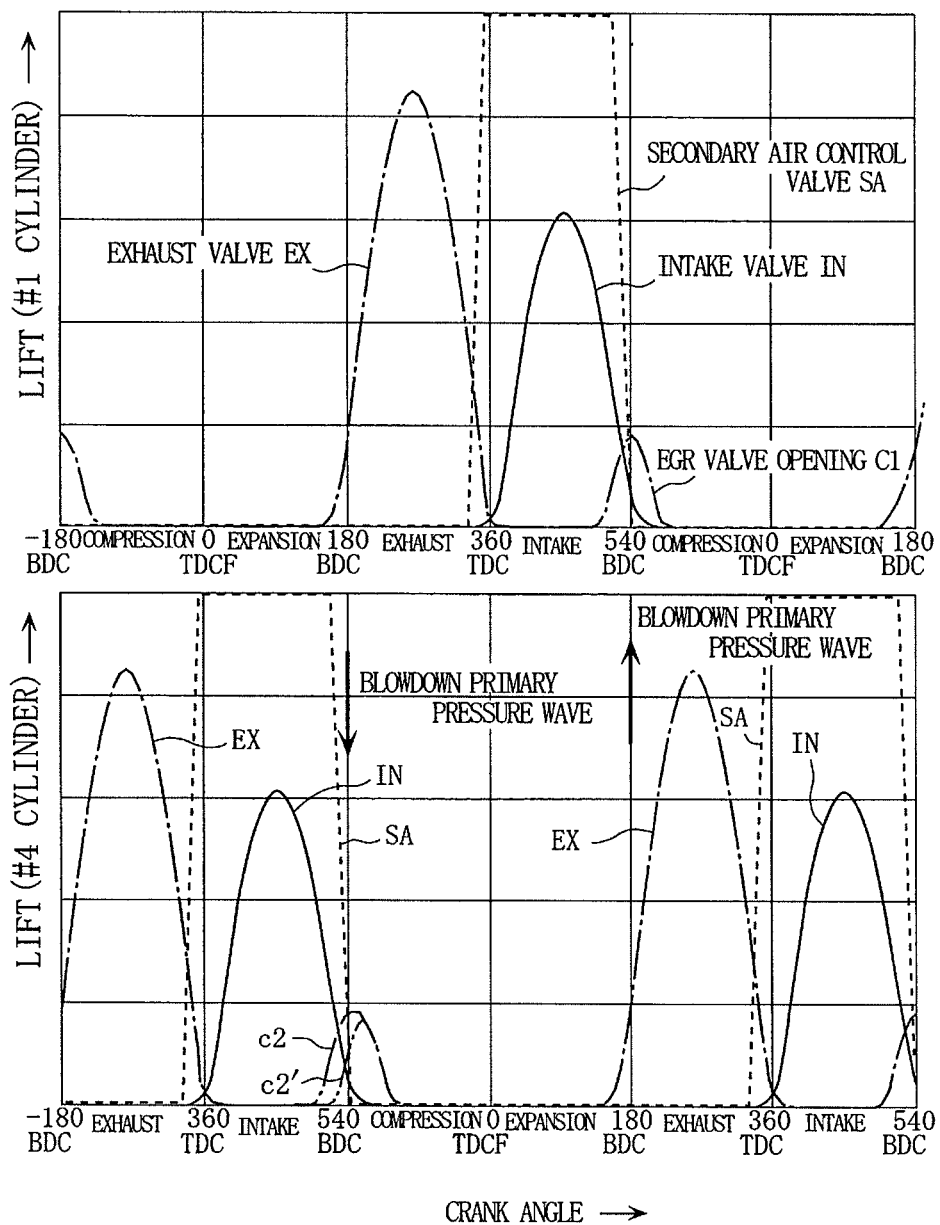
FIG. 12 is a graph showing EGR valve opening curves of first, second exhaust valves of the engine of the second embodiment.
Figure 13:
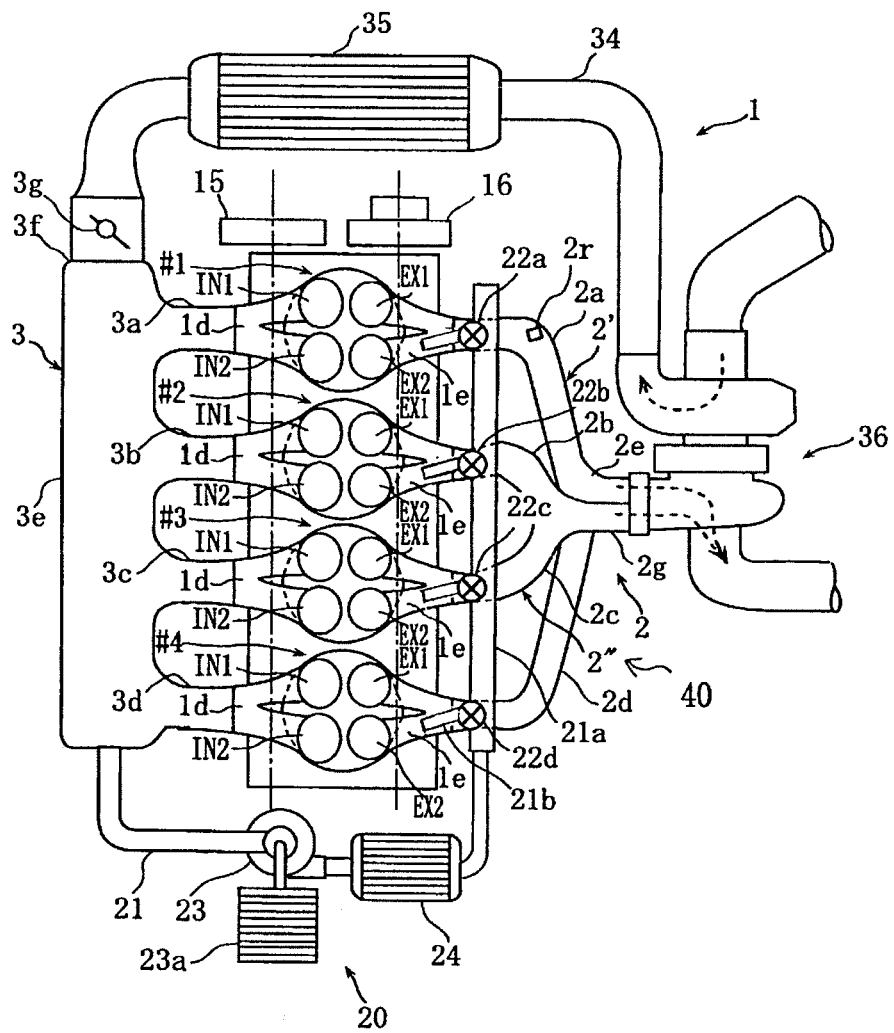
FIG. 13 is a schematic structural view of an engine of a third embodiment of the present invention.
Figure 14:
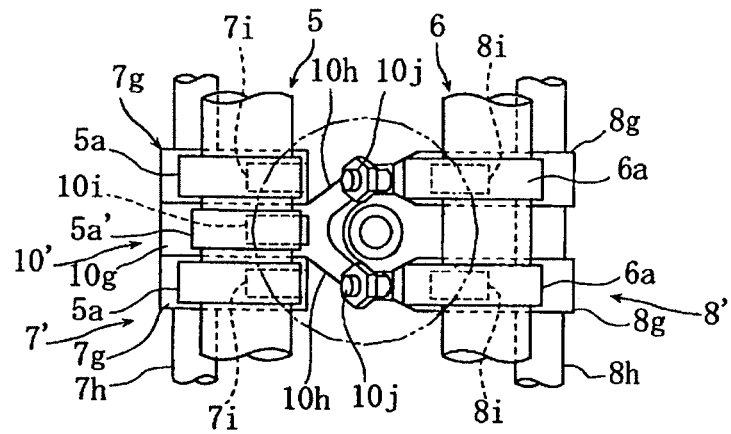
FIG. 14 is a schematic plan view of a valve device of the engine of the third embodiment.
Figure 15:
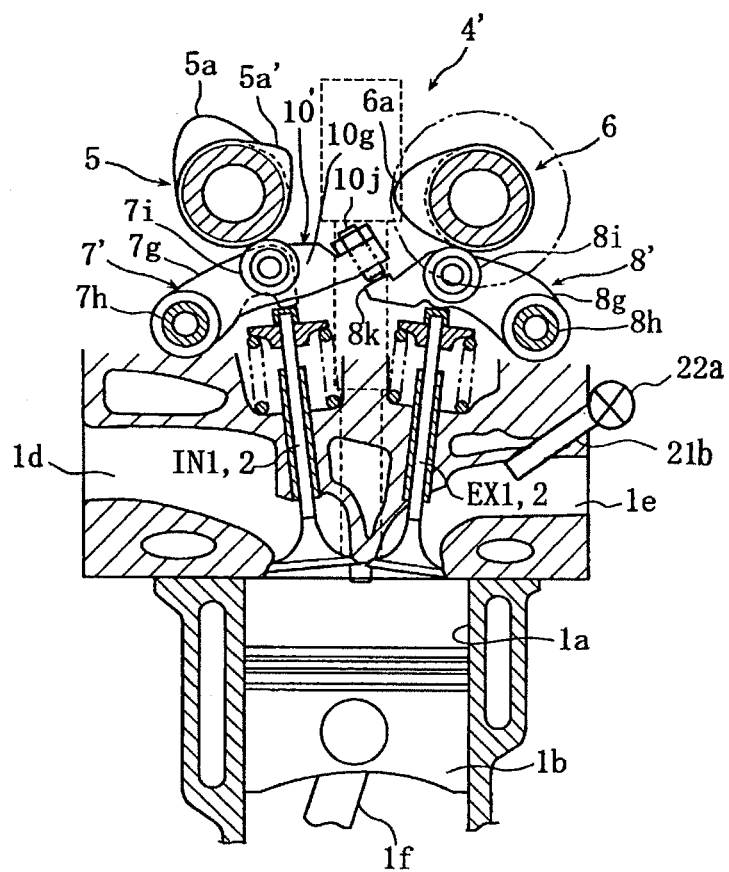
FIG. 15 is a cross-sectional side view of the engine of the third embodiment.

FIG. 10 to FIG. 12 are a view and graphs respectively for describing a four-cycle engine according to a second embodiment of the present invention. In the aforementioned first embodiment, the secondary air is compressed by the auxiliary supercharger (air pump) and then supplied to the header part, and is further supplied to the second exhaust port of each cylinder by opening/closing of the secondary air control valve. The second embodiment is an example in which fresh air is supplied to the second exhaust port via the cylinder. In the drawings, the same reference numerals as in FIG. 1 and FIG. 5 denote the same or corresponding parts.

In middle of the air introduction path 30 connected to a surge tank 3e of an engine 1 of the second embodiment, a main supercharger 31 driven by an electric motor or engine output is interposed, so as to supply fresh air compressed at a predetermined pressure to the engine 1. In addition, numeral 30a denotes a bypass detouring the main supercharger 31, numeral 30b denotes a bypass valve which opens/closes the bypass 30a, numeral 32 denotes an intercooler which decreases the temperature of compressed fresh air, and numeral 33 denotes an air cleaner.

Compressed fresh air from the main supercharger 31 is introduced into the cylinder bore of the #1 cylinder from the intake port 1d by opening of the intake valves in an intake stroke of the #1 cylinder. As shown in FIG. 12, near the end of this intake stroke, there is a relatively long overlap period in which the second exhaust valve EX2 starts EGR valve opening at a timing earlier than closing of the intake vales and thus the intake valves are open and the second exhaust valve EX2 is open by the EGR valve opening (see an EGR valve opening curve c2 in FIG. 12). Moreover, also due to the introduced fresh air being in a compressed state, part of the fresh air flows through to the second exhaust port 1e of the #1 cylinder from the second exhaust valve opening 1e' via the cylinder. This fresh air flown through is stored in the second exhaust port 1e as secondary air (see positive part c of the EGR flow rate megr in FIG. 11).

On the other hand, the first exhaust valve EX1 of the first exhaust port 1p starts the EGR valve opening later than the second exhaust valve EX2, so that the actual overlap period in which the intake valves are open and the first exhaust valve EX1 is open is shorter (see an EGR valve opening curve c2' in FIG. 12). This restrains the fresh air from flowing through to the first exhaust port 1p.

In a state that the exhaust gas remains in the first exhaust port 1p of the #1 cylinder and the secondary air is stored in the second exhaust port 1e as described above, the exhaust valves of the #4 cylinder start to open near the expansion stroke bottom dead center, and thereby an exhaust blowdown pressure wave in the #4 cylinder reaches the first, second exhaust ports 1p, 1e of the #1 cylinder via the exhaust pipes 2d, 2a set to the predetermined lengths while the first, second exhaust valves EX1 and EX2 are in the EGR valve opening state. By this blowdown pressure wave, the exhaust gas in the first exhaust port 1p of the #1 cylinder is pushed into the #1 cylinder and the secondary air stored in the second exhaust port 1e is pushed into the #1 cylinder together with a small amount of EGR gas.

In this second embodiment, the first temperature layer T1 at a high temperature composed of EGR gas is formed on the first exhaust port 1p side in the cylinder bore 1a, and the second temperature layer T2 at a temperature lower than that of the first temperature layer T1 composed of mainly the secondary air and a small amount of EGR gas is formed on the second exhaust port 1e side. This can restrain a rapid rise of the combustion temperature.

By allowing fresh air to flow through to the second exhaust port 1e side via the cylinder bore by the mechanical main supercharger 31, and storing the fresh air flown through in the second exhaust port 1e as secondary air, it is unnecessary to have a special system for supplying the secondary air to the exhaust port in advance, resulting in a simple structure.

Further, by introducing the secondary air, the mass of in-cylinder air-fuel mixture increases more than in a simple supercharged engine in which fresh air is supercharged from the intake system just by the main supercharger 31, and thus the HCCI operation range can be widened while suppressing the mechanical loss.

FIG. 13 to FIG. 16 are views for describing a third embodiment of the present invention. In these drawings, the same reference numerals as in FIG. 1, FIG. 5 and FIG. 10 denote the same or corresponding parts.

In an engine 1 of the third embodiment, a merging pipe 2e of a first exhaust system 2' and a merging pipe 2g of a second exhaust system 2" are connected to a turbocharger 36 having one common variable nozzle turbine. An intercooler 35 is interposed in an air path 34 connecting an air discharge port of the turbocharger 36 and a surge tank 3e. Further, a pressure sensor 2r is disposed on an exhaust branch pipe 2a.

Further, the engine 1 of the third embodiment has a secondary air supply system 20 having the same structure as that of the above-described first embodiment. This secondary air supply system 20 includes a secondary air supply path 21 connecting the surge tank 3e and the exhaust ports 1e, an auxiliary supercharger 23 and an intercooler 24 interposed in the secondary air supply path 21, and secondary air control valves 22a to 22d.

Further, an intake valve drive system 7', an exhaust valve drive system 8', and an EGR valve opening system 10' of a valve device 4' of the engine 1 are structured as follows.

The intake valve drive system 7' drives the intake valves to open/close by pressing with intake cam noses 5a rollers 7i disposed on tip portions of intake rocker arms 7g supported rockably by an intake rocker shaft 7h.

Further, the exhaust valve drive system 8' drives the exhaust valves to open/close by pressing with exhaust cam noses 6a rollers 8i disposed on tip portions of exhaust rocker arms 8g supported rockably by an exhaust rocker shaft 8h.

The EGR valve opening system 10' is structured to press-drive with an EGR cam nose 5a' a roller 10i disposed in a middle portion of a drive lever 10g rockably supported by the above intake rocker shaft 7h. The drive lever 10g has bifurcated pressing pieces 10h, 10h, and is structured to press front end portions 8k, 8k of the exhaust rocker levers 8g, 8g by pressing pins 10j, 10j, which are screwed into the pressing pieces 10h, 10h in a manner that their positions in an axial direction can be adjusted.

In a turbocharged engine, in a period of turbo lag in which the rotational speed of the turbocharger is not sufficient, increase in the intake port internal pressure is delayed, and thus a delay occurs in increase of the intake air amount. Moreover, the exhaust pressure becomes higher than the intake pressure, and generation of torque is further delayed due to increase in residual gas and increase in pumping loss.

Figure 16:
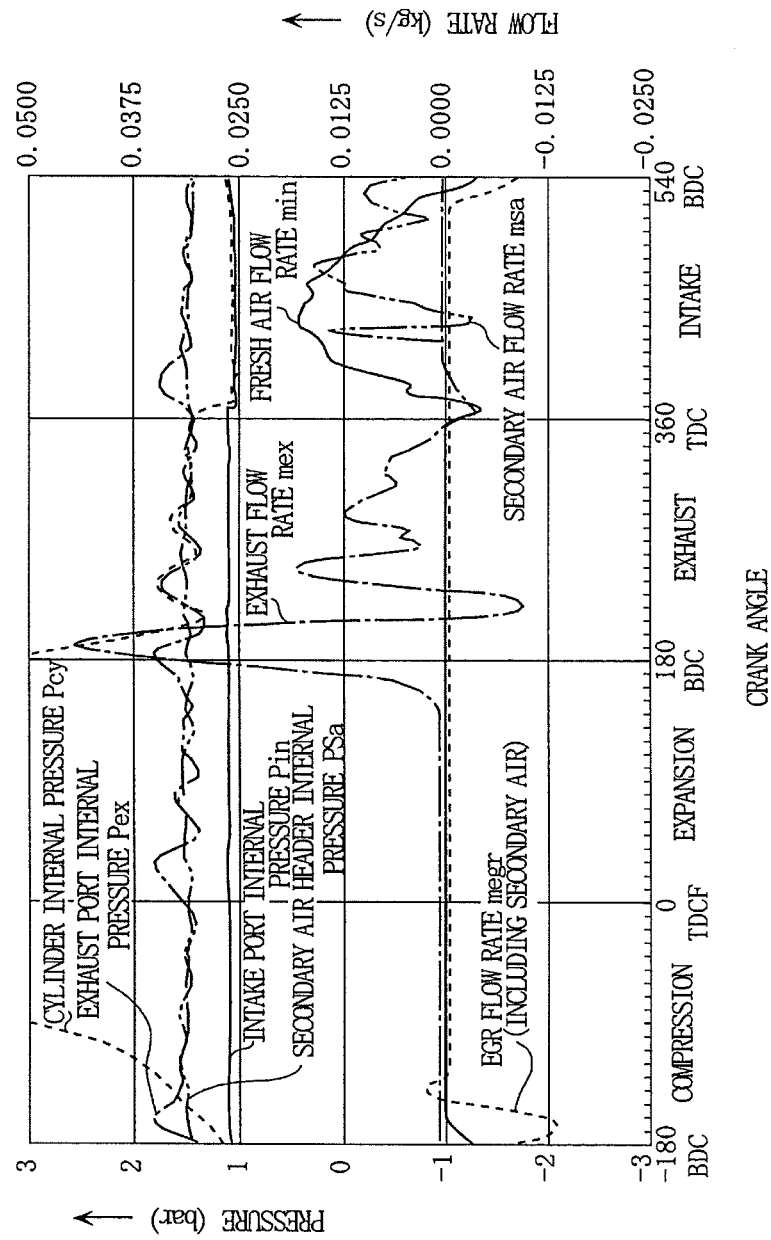
FIG. 16 is a characteristic graph of various pressures and flow rates of the engine of the third embodiment.
Figure 17:
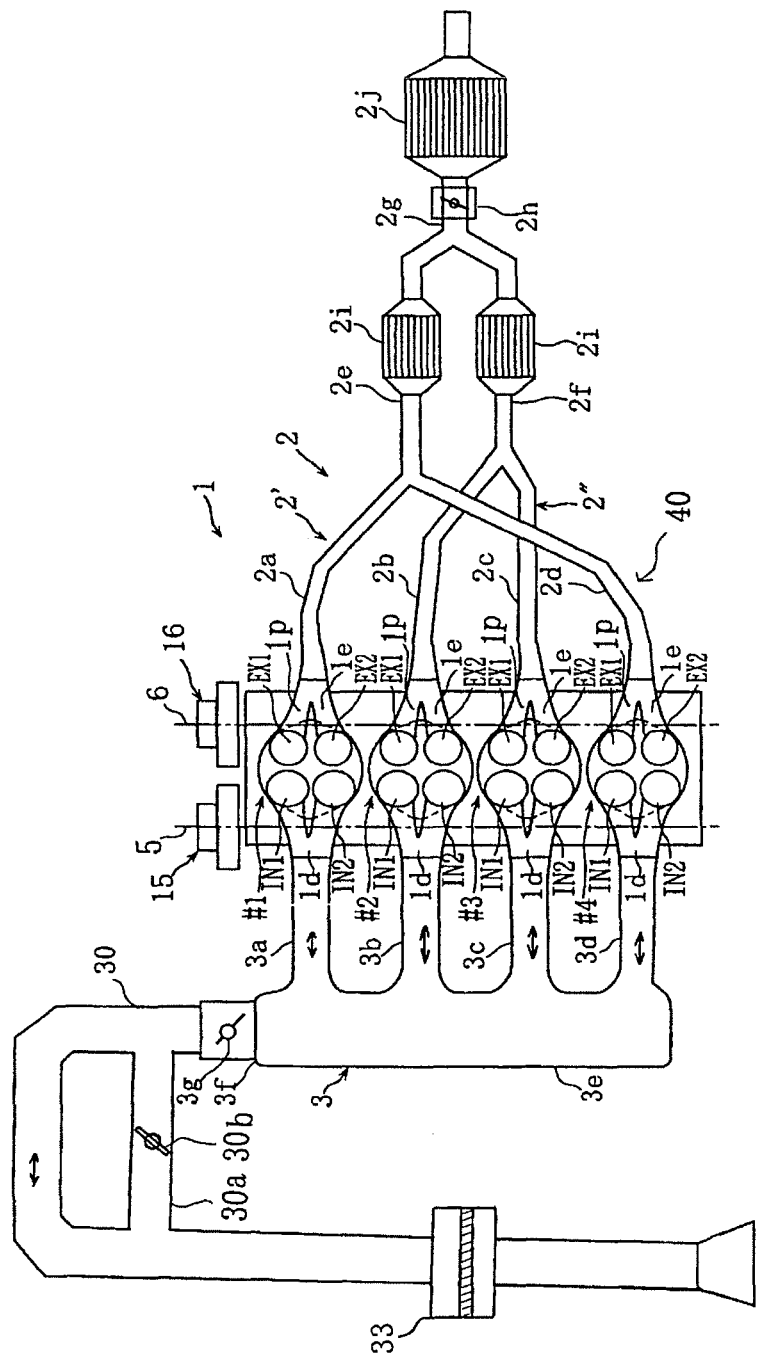
FIG. 17 is a schematic structural view of an engine of a fourth embodiment of the present invention.

In the third embodiment, as shown by a secondary air header internal pressure psa in FIG. 16, the engine is structured such that secondary air is supplied to the exhaust port 1e at a pressure of about 1.5 bar for example by the auxiliary supercharger 23, so as to supercharge EGR gas together with this secondary air by an exhaust blowdown pressure wave. Particularly, in the period of the turbo lag, the exhaust pressure is relatively high, and thus the secondary air can be supercharged from the second exhaust port 1e side and the exhaust gas can be supercharged from the first exhaust port 1p side, into the cylinder bore more effectively using the exhaust blowdown pressure wave.

Thus, a temperature stratification composed of the first temperature layer and the second temperature layer can be formed in the cylinder bore to thereby realize slow combustion. Further, transient torque can be increased by increasing the fuel injection amount by the amount of secondary air increased in this manner. Consequently, turbine supercharging energy supplied to the turbocharger 36 increases, and rotation increase speed of the turbocharger 36 increases. Accordingly, the response of the turbocharging can be improved.

Incidentally, in a normal operation state in which the rotational speed of the turbocharger is high enough, driving of the auxiliary supercharger 23 may be stopped. In the normal operation state, the intake port pressure becomes higher than the exhaust port pressure, and thus fresh air is supplied to the exhaust ports 1e via the secondary air introduction path 21 while idle rotating the auxiliary supercharger 23. Consequently, the above-described torque increase effect is obtained even when the auxiliary supercharger 23 is stopped driving, and the low-speed torque increases.

Further, in the engine of the third embodiment, it is needed to set the exhaust pipe lengths of the first, second exhaust systems 2', 2" to such lengths that a primary pressure wave of blowdown gas from one cylinder reaches the exhaust port of another cylinder at a predetermined timing. Particularly in the second exhaust system 2", it is sometimes difficult to assure the required lengths. Accordingly, in the operation range in which the EGR gas supercharging is performed, it is desirable that the phase of the exhaust cam shaft 6 is delayed in angle larger than normal by the exhaust cam phase variable system 16. Incidentally, a cam phase variable system for the intake cam shaft 5 may be provided.

As described above, in the turbocharger 36 in the third embodiment, when performing a transient operation time such as starting acceleration, the turbine rotation is low and thus the exhaust pressure becomes automatically higher than the intake pressure. In such acceleration, when the variable nozzle is controlled in a closing direction, the exhaust pressure increases further. When the turbine rotation increases and gets close to a normal state, the intake pressure increases and controls the variable nozzle in an open direction, and thus the EGR introduction amount decreases to facilitate increase of output. Further, while starting or warming up, the variable nozzle is narrowed to be substantially totally closed, to be substituted for the exhaust throttles.

FIG. 17 to FIG. 20 are a view and graphs respectively for describing a four-cycle engine according to a fourth embodiment of the present invention. In the drawings, the same reference numerals as in FIG. 1 and FIG. 10 denote the same or corresponding parts.

Though fresh air is compressed and supplied into the cylinder by the main supercharger 31 in the second embodiment, the fourth embodiment is an example in which fresh air under compression is supplied to the cylinder without providing the main supercharger and part of the compressed fresh air is supplied to the second exhaust port via the cylinder.

The engine 1 of the fourth embodiment is structured to supply fresh air into the cylinder at a pressure equal to or higher than the exhaust port internal pressure utilizing dynamic effects (pulsation effects) of the intake system and the exhaust system and allow the supplied compressed fresh air to flow through into the exhaust port by EGR valve opening of the exhaust valve to be stored in the exhaust port as secondary air.

Specifically, an air introduction path 30 connected to a surge tank 3e is structured to achieve the dynamic effects by a column of intake air at a predetermined number of rotations of the engine by setting the length and the cross-sectional area of the air introduction path 30. Further, in middle of the air introduction path 30, a bypass 30a is disposed, and an open/close valve 30b is interposed in the bypass 30a.

The dynamic effects are achieved in a lower speed rotation range of the engine with a longer actual length of the air introduction path 30, and the dynamic effects are achieved in a higher speed rotation range of the engine with a shorter actual length of the air introduction path 30. More specifically, when the open/close valve 30b is closed, the actual length of the air introduction path 30 is increased, and the dynamic effects are achieved, for example, at 1500 rpm to 2000 rpm. When the open/close valve 30b is opened, the actual length is decreased, and the dynamic effects are achieved, for example, at 2000 rpm to 2500 rpm.

Figure 18:
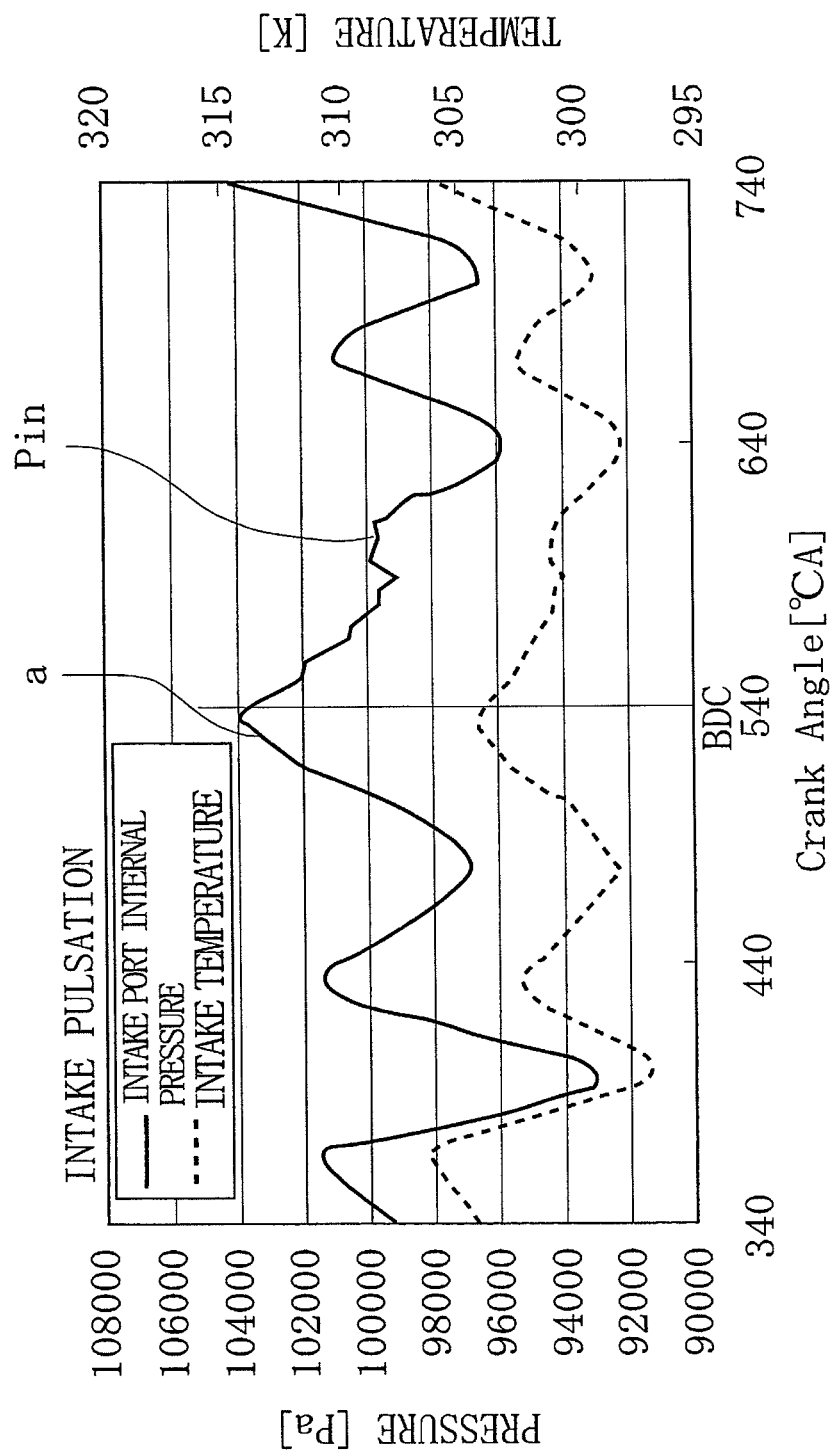
FIG. 18 is a graph showing the state of intake pulsation of the engine of the fourth embodiment.
Figure 19:
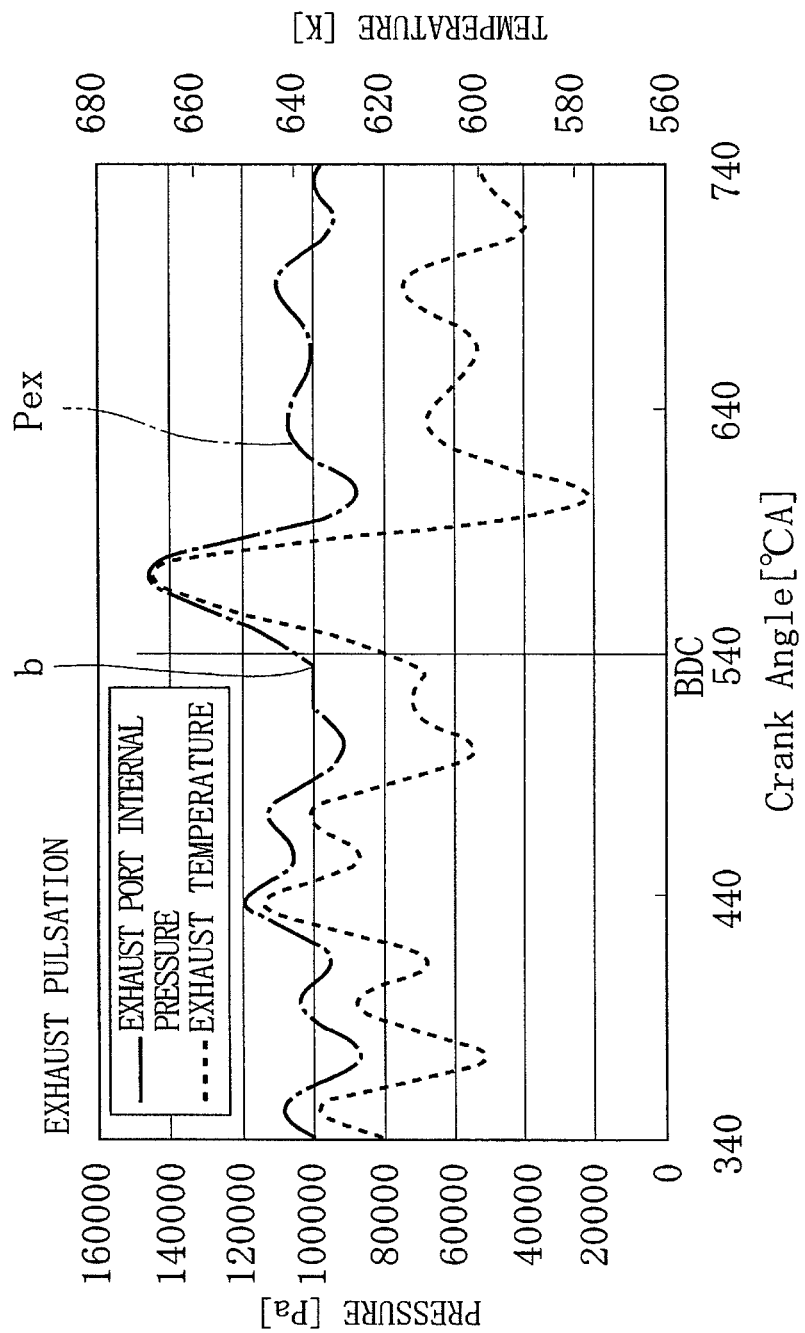
FIG. 19 is a graph showing the state of exhaust pulsation of the engine of the fourth embodiment.
Figure 20:
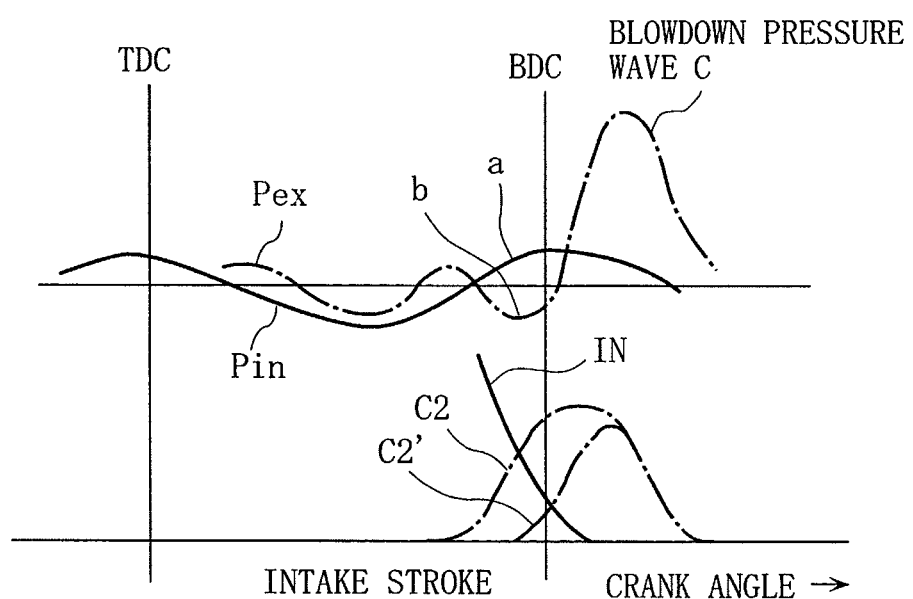
FIG. 20 is a characteristic graph showing the relation between the intake, exhaust port pressures and the EGR valve opening curves of the engine of the fourth embodiment.

FIG. 18 shows the state of intake pulsation at an intake port internal pressure pin of the #1 cylinder, and FIG. 19 shows the state of exhaust pulsation at an exhaust port internal pressure pex of the #1 cylinder. FIG. 20 shows lift curves of an intake port internal pressure pin, an exhaust port internal pressure pex, EGR valve opening curves c2', c2 of the first, second exhaust valves EX1, EX2, and a lift curve of the intake valve.

As is clear from the drawings, a high pressure (see a symbol a) is achieved in the intake port immediately before the bottom dead center in an intake stroke (a crank angle of 540 degrees), whereas the exhaust port internal pressure is a low pressure b before the blowdown pressure wave reaches. Therefore, fresh air is introduced into the cylinder at a pressure higher than the exhaust port internal pressure. Further, near the end of the intake stroke, in a relatively long EGR overlap period in which the second exhaust valve EX2 starts EGR valve opening at a timing earlier than closing of the intake vales (see the EGR valve opening curve c2) and thus the intake valves are open and the second exhaust valve EX2 is open by the EGR valve opening, part of the compressed fresh air flows through to the second exhaust port 1e of the #1 cylinder from the second exhaust valve opening 1e' via the cylinder. This fresh air flown through is stored in the second exhaust port 1e as secondary air.

On the other hand, the exhaust valve EX1 of the first exhaust port 1p starts the EGR valve opening later than the second exhaust valve EX2, so that the actual overlap period in which the intake valves are open and the first exhaust valve EX1 is open is shorter (see an EGR valve opening curve c2') to restrain fresh air from flowing through to the first exhaust port 1p.

Subsequently, the exhaust vales of the #4 cylinder start to open near the expansion stroke bottom dead center, and thereby an exhaust blowdown pressure wave in the #4 cylinder reaches the first, second exhaust ports 1p, 1e of the #1 cylinder. By this blowdown pressure wave c, the exhaust gas in the first exhaust port 1p of the #1 cylinder is pushed into the #1 cylinder and the secondary air stored in the second exhaust port 1e is pushed into the #1 cylinder together with a small amount of EGR gas.

In the above manner, a first temperature layer T1 at a high temperature composed of EGR gas and a second temperature layer T2 at a temperature lower than that of the first temperature layer T1 composed of mainly the secondary air and a small amount of EGR gas can be formed to restrain a sharp rise of the combustion temperature.

Further, by setting the pipe lengths and the pipe diameters of the intake system and the exhaust system to achieve the dynamic effects in this embodiment, the intake port internal pressure can be made higher than the exhaust port internal pressure near the bottom dead center in the intake stroke without providing the supercharger, compressed fresh air can be supplied into the cylinder, and part of the fresh air can be stored in the second exhaust port 1e as secondary air and supercharged into the cylinder by the blowdown pressure wave. Consequently, the same effects as those in the second embodiment can be achieved with the simplest structure without requiring the supercharger nor the secondary air pump.

Figure 21:
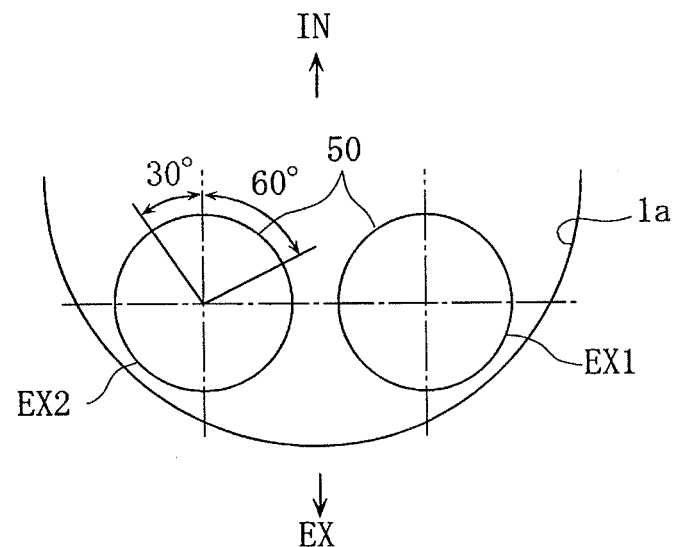
FIG. 21 is a schematic plan view showing the arrangement state of mask members.

FIG. 21 is an example in which mask members 50 are provided at valve heads of the exhaust valves to prevent interference of the flows of the secondary air and EGR gas with the flows of the fresh air from the intake port. The mask members 50 are integrally formed with the valve heads or on the combustion chamber side of the cylinder head.

The mask member 50 is formed in a plate shape having a height in the valve axial direction substantially the same as the lift amount at the EGR valve opening of each of the exhaust valves EX1, EX2 and placed to cover the outer periphery of the valve head, for example, 90 degrees. Specifically, the mask member 50 is formed on the edge portion of the exhaust valve opening to cover about 90 degrees on the intake valve side and nearer the center of the cylinder bore.

When the above-described mask members 50 are provided, it is possible to prevent sucked back exhaust gas and the secondary air from flowing in the cylinder axial direction along the cylinder bore inner wall to bump into the flow of the fresh air from the intake port side, thereby making the temperature difference between the first temperature layer and the second temperature layer more clear.

Note that though the complicated valve device and the variable systems thereof are set in the above embodiments, the object of the invention can be achieved with a simple system such that the EGR valve opening cams are added to exhaust cams of a normal valve device, as long as the HCCI operation range is limited or a certain degree of reduction in performance is tolerated.

Figure 22:
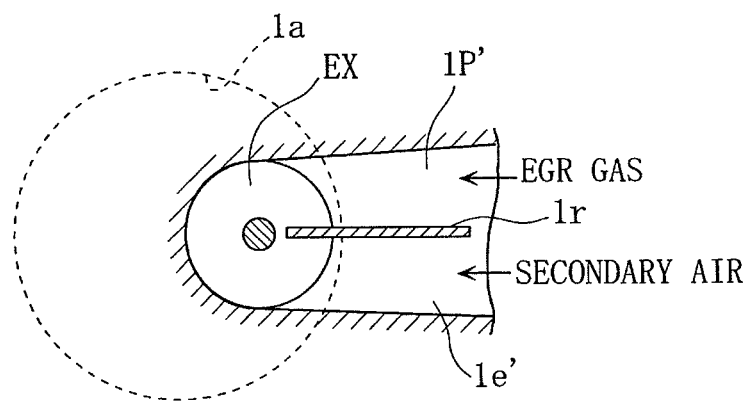
FIG. 22 is a view showing a modification example of the first embodiment.
Figure 23:
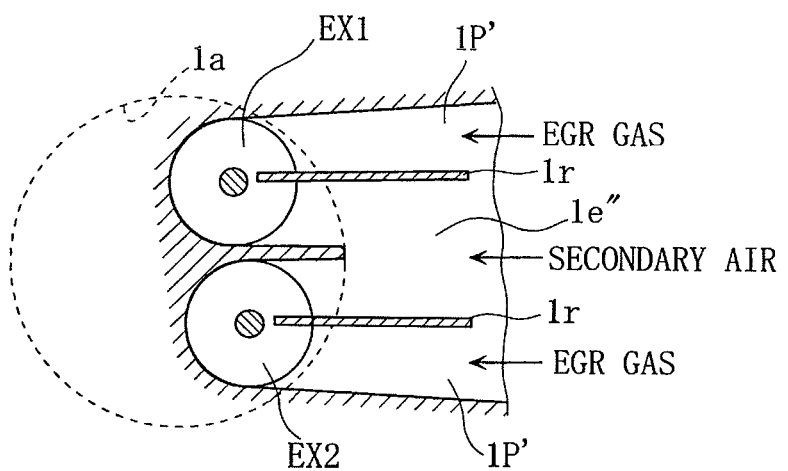
FIG. 23 is a view showing a modification example of the first embodiment.

Although the cases where there are two exhaust valves and two exhaust ports have been described in the above embodiments, the applicable scope of the present invention is not limited to the above-described embodiments as a matter of course, and the present invention is applicable also, for example, to the examples shown in FIG. 22 and FIG. 23.

FIG. 22 is an example in which there is one exhaust valve with one exhaust port. In this case, the engine can be structured such that the one exhaust port is divided by a partition wall 1r into first, second exhaust ports 1e', 1p' so that secondary air is introduced from one exhaust port 1e' into the cylinder and EGR gas is introduced from the other exhaust port 1p' into the cylinder.

FIG. 23 is an example in which there are two exhaust valves with two exhaust ports and the exhaust ports are divided by partition walls 1r, 1r into two exhaust ports each. The engine can be structured such that secondary air is introduced from an exhaust port 1e'' at the middle into the cylinder and EGR gas is introduced from the exhaust ports 1p', 1p' on both sides into the cylinder.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

The invention claimed is:

1. A four-cycle engine comprising:
   a first cylinder, and a second cylinder different in combustion timing from the first cylinder and structured to introduce fresh air into a cylinder via an intake port opened/closed by an intake valve and suck exhaust gas back into the cylinder via at least one of first and second exhaust ports opened/closed by at least one exhaust valve, and including
   a controller for controlling a valve opening system so that the exhaust gas is sucked through the first exhaust port and secondary air is sucked through the second exhaust port to form, in the cylinder, a first temperature layer having a high temperature containing the exhaust gas in the fresh air and a second temperature layer having a temperature lower than that of the first temperature layer containing the secondary air in the fresh air,
   a blowdown pressure wave supercharging system structured to cause a pressure wave from a combustion chamber at opening of the exhaust valves of the first cylinder to act on the exhaust ports of the second cylinder during a reopen period during which the exhaust valves of the second cylinder are reopened; and
   a secondary air supply system supplying secondary air to the second exhaust port,
   wherein the reopen period of the exhaust valves of the second cylinder is set from near a bottom dead center of an intake stroke to near a bottom dead center of a compression stroke of the second cylinder and the blowdown pressure wave from the first cylinder acts on the exhaust ports of the second cylinder during the reopen period to introduce the exhaust gas through the first exhaust port into the second cylinder and introduce the secondary air supplied into the second exhaust port by the secondary air supply system into the second cylinder.

2. The four-cycle engine according to claim 1,
   wherein the secondary air supply system comprises an air pump connected to the second exhaust port via a secondary air supply path, and an open/close control valve interposed in the secondary air supply path, and supplies the secondary air to the second exhaust port during a close period of the exhaust valves, and
   wherein the reopen period of the exhaust valves of the second cylinder is set from near the bottom dead center of the intake stroke to near the bottom dead center of the compression stroke of the second cylinder, and the blowdown pressure wave acts on the exhaust ports of the second cylinder during the reopen period to introduce the exhaust gas from the first exhaust port into the second cylinder and introduce the secondary air supplied into the second exhaust port into the second cylinder from the second exhaust port.

3. The four-cycle engine according to claim 1,
   wherein the engine comprises an intake system having a supercharger driven by an electric motor or engine output interposed therein, and is structured to supply compressed fresh air at a pressure equal to or higher than an exhaust port internal pressure into the cylinders,
   wherein the secondary air supply system is structured to allow the compressed fresh air supplied from the intake system to flow through to the second exhaust port side to thereby supply the compressed fresh air into the second exhaust port during an EGR overlap period of the intake valve in the intake stroke and the second exhaust valve of the second exhaust port during the reopen period, and
   wherein the reopen period of the exhaust valves of the second cylinder is set from near the bottom dead center of the intake stroke to near the bottom dead center of the compression stroke of the second cylinder, and the blowdown pressure wave from the first cylinder acts on the exhaust ports of the second cylinder during the reopen period to introduce the exhaust gas from the first exhaust port into the second cylinder and introduce the secondary air supplied into the second exhaust port into the second cylinder.

4. The four-cycle engine according to claim 1,
   wherein the engine is structured to supply compressed fresh air at a pressure equal to or higher than an exhaust port internal pressure into the cylinders by dynamic effects of an intake system and an exhaust system,
   wherein the secondary air supply system is structured to allow the compressed fresh air supplied from the intake system to flow through to the second exhaust port side to thereby supply the compressed fresh air into the second exhaust port during an EGR overlap period of the intake valve in the intake stroke and the second exhaust valve of the second exhaust port during the reopen period, and
   wherein the reopen period of the exhaust valves of the second cylinder is set from near the bottom dead center of the intake stroke to near the bottom dead center of the compression stroke of the second cylinder, and the blowdown pressure wave from the first cylinder acts on the exhaust ports of the second cylinder during the reopen period to introduce the exhaust gas from the first exhaust port into the second cylinder and introduce the secondary air supplied into the second exhaust port into the second cylinder.

5. The four-cycle engine according to claim 3,
   wherein a reopen start time of the second exhaust valve is set to be earlier than a close time of the intake valve and a reopen start time of the first exhaust valve is set to be later than the reopen start time of the second exhaust valve, and the blowdown pressure wave from the first cylinder acts on the exhaust ports of the second cylinder during the reopen periods of the first exhaust valve and the second exhaust valve of the second cylinder.

6. The four-cycle engine according to claim 2,
   wherein a combustion control is conducted by controlling a valve open period of the open/close control valve for each cylinder or each cycle.

7. The four-cycle engine according to claim 4,
   wherein a reopen start time of the second exhaust valve is set to be earlier than a close time of the intake valve and a reopen start time of the first exhaust valve is set to be later than the reopen start time of the second exhaust valve, and the blowdown pressure wave from the first cylinder acts on the exhaust ports of the second cylinder during the reopen periods of the first exhaust valve and the second exhaust valve of the second cylinder.

8. The four-cycle engine according to claim 1, wherein a mask member to restrain flow of the sucked back exhaust gas to the intake valve side is provided on an opening on the combustion chamber side of the exhaust port.

9. The four-cycle engine according to claim 2, wherein a mask member to restrain flow of the sucked back exhaust gas to the intake valve side is provided on an opening on the combustion chamber side of the exhaust port.

10. The four-cycle engine according to claim 3, wherein a mask member to restrain flow of the sucked back exhaust gas to the intake valve side is provided on an opening on the combustion chamber side of the exhaust port.

11. The four-cycle engine according to claim 4, wherein a mask member to restrain flow of the sucked back exhaust gas to the intake valve side is provided on an opening on the combustion chamber side of the exhaust port.

12. The four-cycle engine according to claim 5, wherein a mask member to restrain flow of the sucked back exhaust gas to the intake valve side is provided on an opening on the combustion chamber side of the exhaust port.

13. The four-cycle engine according to claim 1, comprising:
a first fuel injection valve supplying fuel to the first temperature layer and a second fuel injection valve supplying fuel to the second temperature layer, wherein a ratio of the fuels injected from the first, second fuel injection valves is controlled.

14. The four-cycle engine according to claim 2, comprising:
a first fuel injection valve supplying fuel to the first temperature layer and a second fuel injection valve supplying fuel to the second temperature layer, wherein a ratio of the fuels injected from the first, second fuel injection valves is controlled.

15. The four-cycle engine according to claim 3, comprising:
a first fuel injection valve supplying fuel to the first temperature layer and a second fuel injection valve supplying fuel to the second temperature layer, wherein a ratio of the fuels injected from the first, second fuel injection valves is controlled.

16. The four-cycle engine according to claim 4, comprising:
a first fuel injection valve supplying fuel to the first temperature layer and a second fuel injection valve supplying fuel to the second temperature layer, wherein a ratio of the fuels injected from the first, second fuel injection valves is controlled.

17. The four-cycle engine according to claim 5, comprising:
a first fuel injection valve supplying fuel to the first temperature layer and a second fuel injection valve supplying fuel to the second temperature layer, wherein a ratio of the fuels injected from the first, second fuel injection valves is controlled.

18. The four-cycle engine according to claim 6, comprising:
a first fuel injection valve supplying fuel to the first temperature layer and a second fuel injection valve supplying fuel to the second temperature layer, wherein a ratio of the fuels injected from the first, second fuel injection valves is controlled.

19. A four-cycle engine structured to introduce fresh air into a cylinder via an intake port opened/closed by an intake valve and suck exhaust gas back into the cylinder via at least one of first and second exhaust ports opened/closed by at least one exhaust valve, and including
a controller for controlling an EGR valve opening system so that the exhaust gas is sucked through the first exhaust port and secondary air is sucked through the second exhaust port to form, in the cylinder, a first temperature layer at a high temperature containing the exhaust gas in the fresh air and a second temperature layer having a temperature lower than that of the first temperature layer containing the secondary air in the fresh air,
a first cylinder, and a second cylinder different in combustion timing from the first cylinder;
a blowdown pressure wave supercharging system structured to cause a pressure wave from a combustion chamber at opening of the exhaust valves of the first cylinder to act on the exhaust ports of the second cylinder during a reopen period during which the exhaust valves of the second cylinder are reopened; and
a secondary air supply system supplying secondary air to the second exhaust port,
wherein the reopen period of the exhaust valves of the second cylinder is set from near a bottom dead center of an intake stroke to near a bottom dead center of a compression stroke of the second cylinder and the blowdown pressure wave from the first cylinder acts on the exhaust ports of the second cylinder during the reopen period to introduce the exhaust gas from the first exhaust port into the second cylinder and introduce the secondary air supplied into the second exhaust port by the secondary air supply system into the second cylinder.

* * * * *